United States Patent
Zavadsky et al.

(10) Patent No.: US 12,252,921 B2
(45) Date of Patent: Mar. 18, 2025

(54) ROBOTIC VEHICLE AND A LID CONTROLLER MECHANISM FOR A LID THEREOF

(71) Applicant: YANDEX SELF DRIVING GROUP LLC, Moscow (RU)

(72) Inventors: Viktor Zavadsky, Moscow (RU); Mikhail Khalizov, Moscow (RU); Vasily Pastushak, Kaluga (RU); Efim Zhuravlev, Saint Petersburg (RU); Aleksandr Buraga, Shchelkovo (RU)

(73) Assignee: Y.E. Hub Armenia LLC, Yerevan (AM)

( * ) Notice: Subject to any disclaimer, the term of this patent is extended or adjusted under 35 U.S.C. 154(b) by 73 days.

(21) Appl. No.: 18/117,355

(22) Filed: Mar. 3, 2023

(65) Prior Publication Data

US 2023/0304349 A1  Sep. 28, 2023

(30) Foreign Application Priority Data

Mar. 25, 2022  (RU) .......................... RU2022107998

(51) Int. Cl.
  *E05F 15/611*  (2015.01)
  *B60P 3/00*   (2006.01)
  (Continued)

(52) U.S. Cl.
  CPC ............ *E05F 15/611* (2015.01); *B60P 3/007* (2013.01); *B65D 43/16* (2013.01); *B65D 43/26* (2013.01);
  (Continued)

(58) Field of Classification Search
  CPC ......... E05F 15/611; E05F 15/70; E05F 15/41; B60P 3/007; B65D 43/16; B65D 43/26;
  (Continued)

(56) References Cited

U.S. PATENT DOCUMENTS

| | | | |
|---|---|---|---|
| 4,145,641 A | 3/1979 | Ozaki | |
| 6,118,243 A * | 9/2000 | Reed ........................ | E05F 15/41 49/28 |

(Continued)

FOREIGN PATENT DOCUMENTS

| | | |
|---|---|---|
| CN | 204960631 U | 1/2016 |
| CN | 109984679 A | 7/2019 |

(Continued)

OTHER PUBLICATIONS

Extended European Search Report dated Sep. 15, 2023 issued in respect of the counterpart European Patent Application No. 23162322.4.

(Continued)

*Primary Examiner* — David Luo
(74) *Attorney, Agent, or Firm* — BCF LLP

(57) ABSTRACT

Method of operating a lid of a robotic vehicle. The lid is operable by a motor between an opened and a closed positions. When the lid is between the opened position and a first intermediary position, a first electric current having a first value is provided to the motor for exerting a first force on the lid. When the lid is between the first intermediary position and a second intermediary position, a second electric current, having a second value whose sign is opposite to a sign of the first value, is provided to the motor for exerting a second force on the lid. The second force is applied in an opposite direction of the first force. When the lid is between the second intermediary position and the closed position, a third electric current having a third value having a same sign than the first value is provided to the motor.

20 Claims, 11 Drawing Sheets

(51) Int. Cl.
*B65D 43/16* (2006.01)
*B65D 43/26* (2006.01)

(52) U.S. Cl.
CPC ... *E05Y 2201/434* (2013.01); *E05Y 2400/356* (2013.01); *E05Y 2400/40* (2013.01); *E05Y 2900/53* (2013.01)

(58) Field of Classification Search
CPC ......... E05Y 2201/434; E05Y 2400/356; E05Y 2400/40; E05Y 2900/53; E05Y 2201/412; E05Y 2201/414; E05Y 2201/416; E05Y 2400/302; E05Y 2400/326; E05Y 2400/358; E05Y 2400/54; E05Y 2400/56; E05Y 2999/00
USPC ................................................ 318/432, 560
See application file for complete search history.

(56) References Cited

U.S. PATENT DOCUMENTS

| | | | |
|---|---|---|---|
| 6,989,767 B2 | 1/2006 | Fitzgibbon et al. | |
| 7,034,487 B1 * | 4/2006 | Murphy | G05B 19/4061 318/468 |
| 7,339,336 B2 | 3/2008 | Gregori | |
| 7,667,425 B2 | 2/2010 | Sommer | |
| 9,535,421 B1 | 1/2017 | Canoso et al. | |
| 10,267,079 B2 | 4/2019 | Mayr | |
| 10,626,658 B2 | 4/2020 | Mayr | |
| 10,655,377 B2 | 5/2020 | Goetzelmann | |
| 2019/0330910 A1 | 10/2019 | Schoedel | |
| 2019/0337706 A1 | 11/2019 | Väin et al. | |
| 2019/0381871 A1 | 12/2019 | Knopp et al. | |
| 2020/0209821 A1 | 7/2020 | Heinla et al. | |
| 2021/0022536 A1 | 1/2021 | Anderson et al. | |

FOREIGN PATENT DOCUMENTS

| | | |
|---|---|---|
| CN | 110576448 A | 12/2019 |
| CN | 210046682 U | 2/2020 |
| CN | 111648689 A | 9/2020 |
| CN | 112012612 A | 12/2020 |
| DE | 202012102047 U1 | 9/2013 |
| EP | 3235991 B1 | 8/2020 |
| JP | 2002314266 A | 10/2002 |
| WO | 2020176509 A1 | 9/2020 |

OTHER PUBLICATIONS

Russian Search Report dated Sep. 27, 2024 issued in respect of the counterpart Russian Patent Application No. RU 2022107998.

* cited by examiner

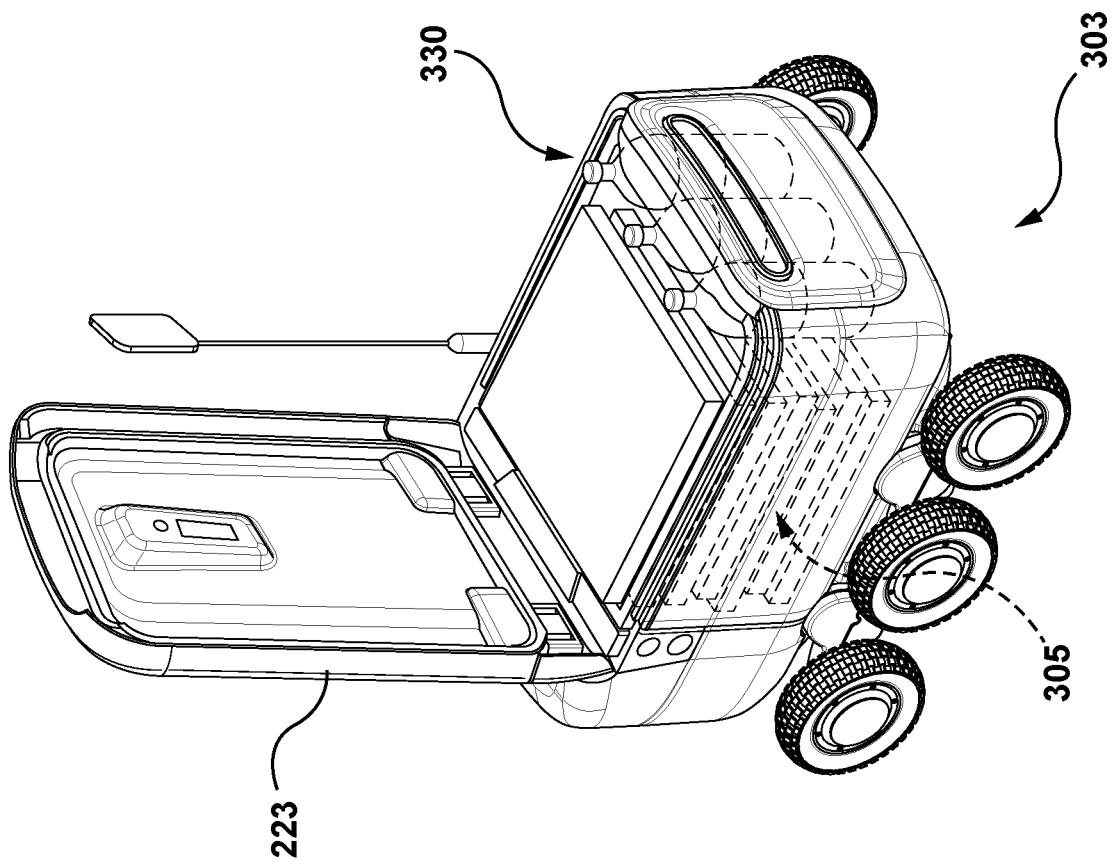
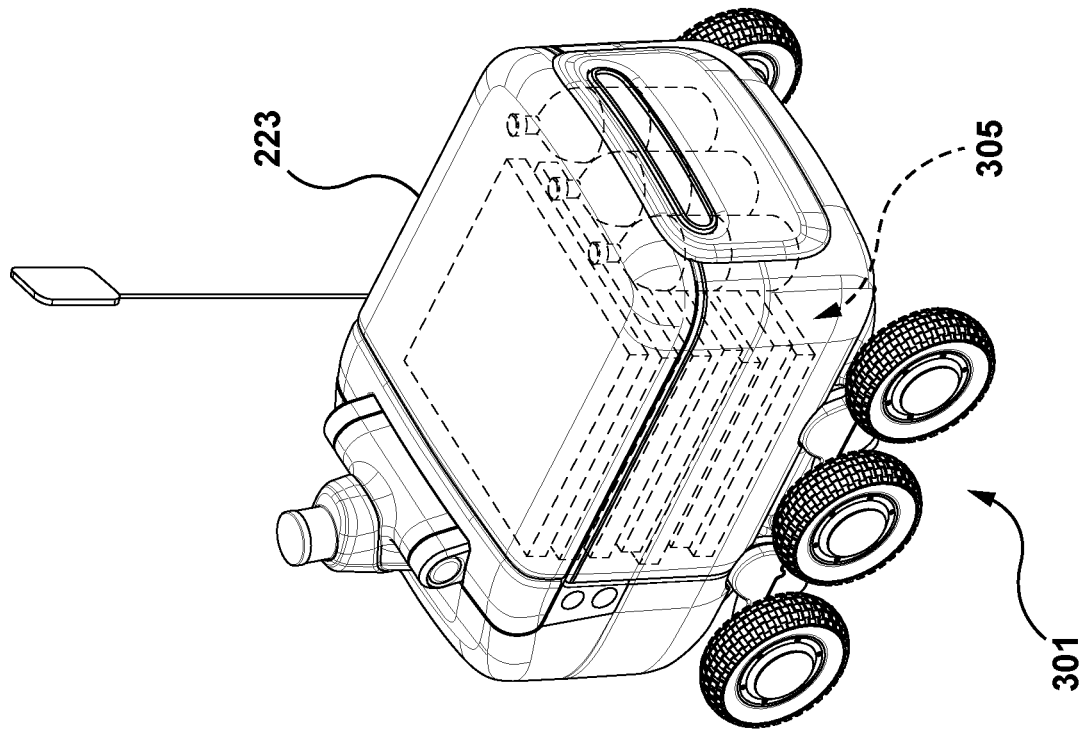
FIG. 3

ROBOTIC VEHICLE AND A LID CONTROLLER MECHANISM FOR A LID THEREOF

CROSS-REFERENCE

The present application claims priority to Russian Patent Application No. 2022107998, filed Mar. 25, 2022, the entirety of which is incorporated by reference herein.

FIELD OF TECHNOLOGY

The present technology relates to a robotic vehicle, and more specifically, to a lid controller mechanism for a lid thereof.

BACKGROUND

Autonomous robotic vehicles are vehicles that are able to autonomously navigate through private and/or public spaces. Using a system of sensors that detects the location and/or surroundings of the robotic vehicle, logic within or associated with the robotic vehicle controls the velocity and direction of the robotic vehicle based on the sensor-detected location and surroundings of the robotic vehicle.

A variety of sensor systems may be used by the robotic vehicle, such as but not limited to camera systems, radar systems, and LIDAR systems. Different sensor systems may be employed for capturing different information, and/or in different format, about the location and the surroundings of the robotic vehicle. For example, LIDAR systems may be used to capture point cloud data for building 3D map representations of the surroundings and other potential objects located in proximity to the robotic vehicle.

Such autonomous robotic vehicles are being used for a wide variety of applications, including delivering packages and other items. To do so, the robotic vehicle may operate a lid or a door serving as a closure or seal of a storage space for placing and/or removing items to be delivered. In performing such operation of the lid, an autonomous robotic vehicle needs to avoid moving the lid in a manner that may inconvenience a user (e.g. a recipient of the items), that may damage the items, or that may damage the lid itself or other components of the robotic vehicle.

US Patent application no. 2019/330910 discloses a method for controlling a drive arrangement for a flap of a motor vehicle by a control arrangement.

SUMMARY

The developers of the present technology have developed a device for a lid controller mechanism for operating a lid of a robotic vehicle. For example, such device may execute seamless movement and operation of the lid of the robotic vehicle.

The developers have devised a method for controlling operation of a lid. The lid is operated by a motor, the motor receiving an electric current controlled by a processor of the lid controller mechanism. More specifically, the lid may be rotated around a rotation axis of a rotation lid shaft.

The developers of the present technology have realized that external environmental forces such as gravitational force and wind load may exert respective torque on the lid, values of the torque varying with an angular position of the lid around the rotation axis. As such, a coupling force exerted by the motor on the lid is adjusted based on the angular position of the lid. More specifically, in some embodiments, the lid may be rotated between a first angular position and a second angular position, one of the first and second positions corresponding to a closed configuration of the lid. In some embodiment, an angular range of movement between the first and second angular position is divided in three phases. An orientation of the coupling force exerted by the motor alternates with the different phases such as to adapt the coupling forces to expected torques of the external environmental forces.

To do so, an encoder communicably connected to the processor may measure a movement value of the lid, such as an angular position thereof. The processor may, based on information provided by the encoder, alternate a sign of the electric current between the different phases of a current rotation of the lid around the rotation axis.

In some embodiments, the processor may determine, based on information provided by the encoder, that a current rotation of the lid is blocked or dampened. As an example, if determination is made that the movement value is below a pre-determined threshold, the rotation of the lid is considered blocked or dampened. In response, the processor may vary the current received by the motor to first increase a coupling force of the motor in a direction of the current rotation of the lid around the rotation axis. A value of the electric current may be adjusted until the movement value reaches the pre-determined threshold. If determination is made that the movement value is still below the pre-determined threshold when the electric current reaches a current threshold, the processor may trigger an emergency action. The processor may adjust the electric current by increasing or decreasing the electric current based on a current phase of the rotation.

In a first broad aspect of the present technology, there is provided a method of operating a lid of a robotic vehicle, the lid providing access to an interior space of the robotic vehicle in an opened position and preventing access to the interior space in a closed position, the lid being operable by a motor for moving the lid between the opened position and the closed position. The method comprises, when the lid is between the opened position and a first intermediary position, the first intermediary position being defined between the opened position and the closed position, providing a first electric current to the motor for exerting a first force on the lid, the first electric current having a first value. The method further comprises, when the lid is between the first intermediary position and a second intermediary position, the second intermediary position being defined between the first intermediary position and the closed position, providing a second electric current to the motor for exerting a second force on the lid, the second electric current having a second value, the second value having a sign opposite to a sign of the first value, the second force being applied in an opposite direction of the first force. The method further comprises, when the lid is between the second intermediary position and the closed position, providing a third electric current to the motor for exerting a third force on the lid, the third electric current having a third value, the third value having a same sign as the sign of the first value, the third force being applied in a same direction as the first force.

In some embodiments of the method, the lid is rotatable about a horizontal axis between the opened position and the closed position, the second force being applied to the lid for partially counteracting a gravitational force applied to the lid between the first intermediary position and the second intermediary position.

In some embodiments of the method, the first value and the third value are positive values, and the second value is a negative value.

In some embodiments of the method, the first value and the third value are negative values, and the second value is a positive value.

In some embodiments of the method, the first value is lower than the third value, and the first force is smaller than the third force.

In some embodiments of the method, the method further comprises locking the lid when in the closed position.

In some embodiments of the method, the method further comprises monitoring a movement value of the lid between the opened position and the closed position, in response to the movement value being below a pre-determined movement value, when the lid is between the opened position and the first intermediary position, increasing the first value of the first electric current to an increased first value for exerting an increased first force on the lid, an absolute value of the increased first value being above an absolute value of the first value; and, in response to the increased first value being equal to a first threshold value, triggering an emergency action.

In some embodiments of the method, the method further comprises monitoring a movement value of the lid between the opened position and the closed position, in response to the movement value being below a pre-determined movement value, when the lid is between the first intermediary position and the second intermediary position, decreasing the second value of the second electric current to a decreased second value for exerting a decreased second force on the lid, an absolute value of the decreased second value being below an absolute value of the second value; and, in response to the decreased second value being equal to a second threshold value, triggering an emergency action.

In some embodiments of the method, triggering the emergency action comprises providing a fourth electric current to the motor for exerting a fourth force on the lid, the fourth electric current having a fourth value, the fourth value having a same sign than a sign of the decreased second value, an absolute value of the fourth value being above the absolute value of the second value, the fourth force being applied in a same direction than the second force.

In some embodiments of the method, triggering the emergency action comprises positioning and maintaining the lid in the opened position.

In some embodiments of the method, triggering the emergency action comprises immobilizing the lid.

In some embodiments of the method, triggering the emergency action further comprises varying, for a pre-determined amount of times, the second value of the second electric current between a nominal value and the decreased second value.

In some embodiments of the method, the lid in the closed position is at 0 degrees with respect to a horizontal plane.

In some embodiments of the method, the lid in the second intermediary position is at 10 degrees with respect to a horizontal plane.

In some embodiments of the method, the lid in the first intermediary position is at 50 degrees with respect to a horizontal plane.

In some embodiments of the method, the lid in the opened position is at 0 degrees with respect to a vertical plane.

In a second broad aspect of the present technology, there is provided a robotic vehicle comprising a body defining an interior space, a lid operable to access the interior space, an electrical power source and a processor configured to control operation of the lid. The processor is configured to provide, when the lid is between the opened position and a first intermediary position, the first intermediary position being defined between the opened position and the closed position, a first electric current from the electrical power source to the motor for exerting a first force on the lid, the first electric current having a first value, provide, when the lid is between the first intermediary position and a second intermediary position, the second intermediary position being defined between the first intermediary position and the closed position, a second electric current from the electrical power source to the motor for exerting a second force on the lid, the second electric current having a second value, the second value having a sign opposite to a sign of the first value, the second force being applied in an opposite direction of the first force. The processor is further configured to provide, when the lid is between the second intermediary position and the closed position, a third electric current from the electrical power source to the motor for exerting a third force on the lid, the third electric current having a third value, the third value having a same sign as the sign of the first value, the third force being applied in a same direction as the first force.

In some embodiments of the robotic vehicle, the lid is rotatable about a horizontal axis between the opened position and the closed position, the second force being applied to the lid for partially counteracting a gravitational force applied to the lid between the first intermediary position and the second intermediary position.

In some embodiments of the robotic vehicle, the first value and the third value are positive values, and the second value is a negative value.

In some embodiments of the robotic vehicle, the first value and the third value are negative values, and the second value is a positive value.

In some embodiments of the robotic vehicle, the first value is lower than the third value, and the first force is smaller than the third force.

In some embodiments of the robotic vehicle, the processor is further configured to lock the lid when in the closed position.

In some embodiments of the robotic vehicle, the processor is further configured to monitor a movement value of the lid between the opened position and the closed position, and in response to the movement value being below a pre-determined movement value, increase, when the lid is between the opened position and the first intermediary position, the first value of the first electric current to an increased first value for exerting an increased first force on the lid, an absolute value of the increased first value being above an absolute value of the first value; and trigger, in response to the increased first value being equal to a first threshold value, an emergency action.

In some embodiments of the robotic vehicle, the processor is further configured to monitor a movement value of the lid between the opened position and the closed position, and, in response to the movement value being below a pre-determined movement value, decrease, when the lid is between the first intermediary position and the second intermediary position, the second value of the second electric current to a decreased second value for exerting a decreased second force on the lid, an absolute value of the decreased second value being below an absolute value of the second value and trigger, in response to the decreased second value being equal to a second threshold value, an emergency action.

In some embodiments of the robotic vehicle, the processor is further configured to, upon triggering the emergency action, provide a fourth electric current to the motor for exerting a fourth force on the lid, the fourth electric current having a fourth value, the fourth value having a same sign than a sign of the decreased second value, an absolute value of the fourth value being above the absolute value of the second value, the fourth force being applied in a same direction than the second force.

In some embodiments of the robotic vehicle, the processor is further configured to, upon triggering the emergency action, cause the motor to position and maintain the lid in the opened position.

In some embodiments of the robotic vehicle, the processor is further configured to, upon triggering the emergency action, cause the motor to immobilize the lid.

In some embodiments of the robotic vehicle, the processor is further configured to, upon triggering the emergency action, cause the motor to vary, for a pre-determined amount of times, the second value of the second electric current between a nominal value and the decreased second value.

In some embodiments of the robotic vehicle, the lid in the closed position is at 0 degrees with respect to a horizontal plane.

In some embodiments of the robotic vehicle, the lid in the second intermediary position is at 10 degrees with respect to a horizontal plane.

In some embodiments of the robotic vehicle, the lid in the first intermediary position is at 50 degrees with respect to a horizontal plane.

In some embodiments of the robotic vehicle, the lid in the opened position is at 0 degrees with respect to a vertical plane.

BRIEF DESCRIPTION OF THE DRAWINGS

These and other features, aspects and advantages of the present technology will become better understood with regard to the following description, appended claims and accompanying drawings where:

FIG. 3 depicts the robotic vehicle with the lid in an opened position and a representation of the robotic vehicle with the lid in a closed position.

DETAILED DESCRIPTION

Figure 1:
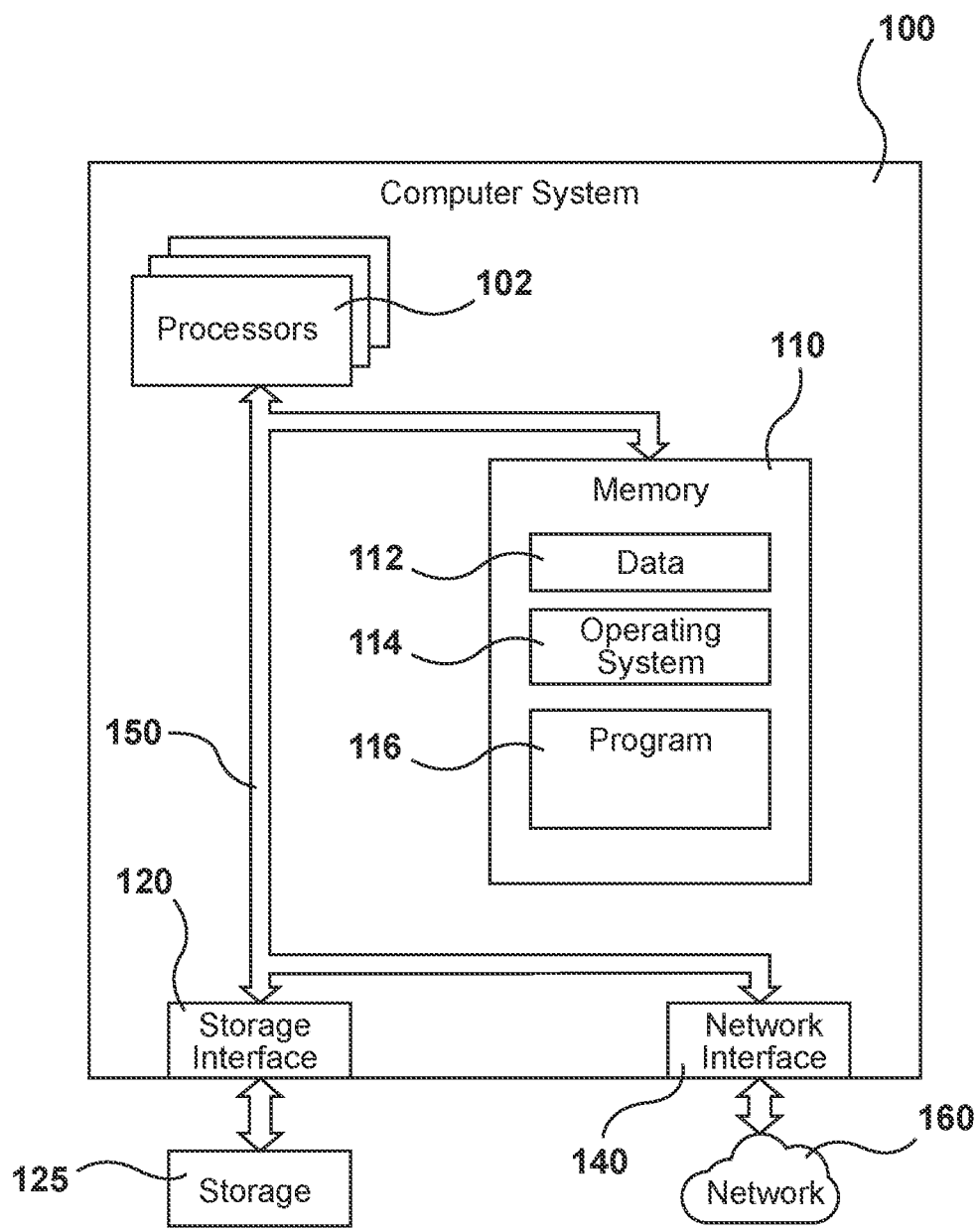
FIG. 1 depicts a schematic diagram of an example computer system for use in some implementations of systems and/or methods of the present technology.

Various representative implementations of the disclosed technology will be described more fully hereinafter with reference to the accompanying drawings. The present technology may, however, be implemented in many different forms and should not be construed as limited to the representative implementations set forth herein. In the drawings, the sizes and relative sizes of layers and regions may be exaggerated for clarity. Like numerals refer to like elements throughout.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random-access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

At least some aspects of the present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random-access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in a computing/processing device may receive computer-readable program instructions via the network and forward the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to generate a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to generate a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

Computer System

FIG. 1 depicts a computer system 100 implemented in accordance with a non-limiting embodiment of the present technology. The computer system 100 may be a laptop computer, a tablet computer, a smartphone, an embedded control system, or any other computer system currently known or later developed. Additionally, it will be recognized that some or all the components of the computer system 100 may be virtualized and/or cloud-based. As shown in FIG. 1, the computer system 100 includes one or more processors 102, a memory 110, a storage interface 120, and a network interface 140. These system components are interconnected via a bus 150, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 110, which may be a random-access memory or any other type of memory, may contain data 112, an operating system 114, and a program 116. The data 112 may be any data that serves as input to or output from any program in the computer system 100. The operating system 114 may be an operating system such as Microsoft Windows™ or Linux™. The program 116 may be any program or set of programs that include programmed instructions that may be executed by the processor to control actions taken by the computer system 100.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the programs 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114.

The network interface 140 is used to connect the computer system 100 to other computer systems or networked devices (not shown) via a network 160. The network interface 140 may include a combination of hardware and software that allows communicating on the network 160. In some implementations, the network interface 140 may be a wireless network interface. The software in the network interface 140 may include software that uses one or more network protocols to communicate over the network 160. For example, the network protocols may include TCP/IP (Transmission Control Protocol/Internet Protocol).

It will be understood that the computer system 100 is merely an example and that the disclosed technology may be used with computer systems or other computing devices having different configurations.

Robotic Vehicle

Figure 2:
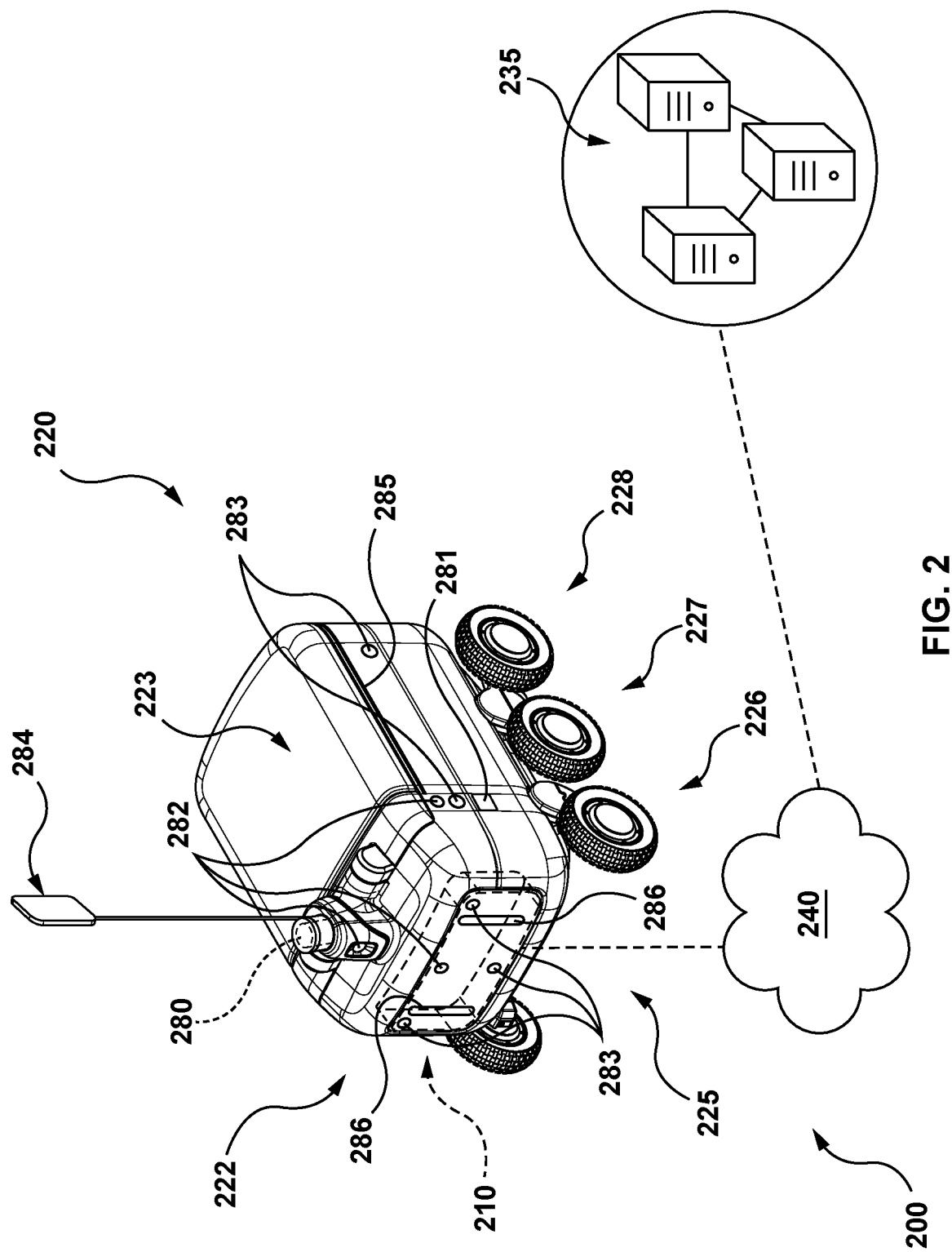
FIG. 2 depicts an electronic device of a robotic vehicle communicatively coupled to a server in accordance with some embodiments of the present technology.

FIG. 2 depicts a networked environment 200 suitable for use with some non-limiting implementations of the present technology. The environment 200 includes a computing device 210 associated with a robotic vehicle 220. The environment 200 also includes one or more servers 235 in communication with the computing device 210 via a communication network 240 (e.g. the Internet or the like).

As can be seen the robotic vehicle 220 can comprise a body 222 and a lid 223. Other configurations for different applications are also possible. The depicted example of the robotic vehicle 220 can be used for the transfer of deliveries (such as mail, groceries, parcels, packages, flowers, medical equipment and/or purchases). With a brief reference to FIG. 3, there is depicted a representation 301 of the robotic vehicle 220 with the lid 223 in an opened position and a representation 303 of the robotic vehicle 220 with the lid 223 in a closed position. When the lid 223 is in an opened position, an opening 309 in the body 222 provides access to an interior storage space 307 for placing and/or removing items 305.

In this embodiment, the lid 223 is made of a plastic material, such as Acrylonitrile butadiene styrene (ABS), with bounded reinforcement made of aluminum alloy (AMg3). A weight of the lid 223 is, for example and without limitations, between 2.2 kilograms and 2.7 kilograms. In this embodiment, a distance from the rotations axis of the lid and a center of mass thereof is 0.4 meter.

Returning to the description of FIG. 2, a chassis 225 is arranged at the bottom of the robotic vehicle 220. As can be seen in the embodiment shown three sets or pairs of wheels are provided—that is, wheels 226, wheels 227 and wheels 228. The robotic vehicle 220 also comprises illumination/signaling elements 284, 285 and 286 that are used for providing visual information to person(s) in the surroundings of the robotic vehicle 220. It is contemplated that a variety of systems and components of the robotic vehicle 220 may be attached to the chassis 225, such as, but not limited to: a suspension system, a battery, exterior panels, electronic components, and a body frame. In some implementations, the chassis 225 may be fabricated from aluminum. In other implementations, both the body 222 and the chassis 225 may be fabricated from a fiberglass material.

In one implementation, the robotic vehicle 220 may have a weight of 70 kg when empty. In another implementation, the robotic vehicle may operate at a top speed of 8 km/h. In a further implementation, the robotic vehicle 220 may have a ground clearance at full load of 100 mm.

The robotic vehicle 220 may be a fully autonomous vehicle that may, in use, travel independently from any human involvement, or a partially autonomous vehicle, in which a human operator can selectively remotely control some aspects of the robotic vehicle's operation, while other aspects are automated or where the human operator controls the operations under certain conditions (such as when the robotic vehicle 220 is stuck and cannot determine in an autonomous regime how to move forward). As one non-limiting example, the robotic vehicle 220 may operate autonomously unless or until it encounters an unexpected or unusual situation that it is unable to handle autonomously, at which time a remote human operator could be contacted. It should be noted that specific parameters of the robotic vehicle 220 are not limiting, these specific parameters including for example: manufacturer, model, year of manufacture, vehicle weight, vehicle dimensions, vehicle weight distribution, vehicle surface area, vehicle height, motor type, tire type (if tires are used), power system, or other characteristics or parameters of a vehicle. The robotic vehicle 220, to which the computing device 210 is associated, could be any robotic vehicle, for delivery applications, warehouse applications, or the like.

In at least some non-limiting implementations of the present technology, the computing device 210 is communicatively coupled to control systems of the robotic vehicle 220. The computing device 210 could be arranged and configured to control different operation systems of the robotic vehicle 220, including but not limited to: motor control, steering systems, and signaling and illumination systems.

In some non-limiting implementations of the present technology, the networked environment 200 could include a GPS satellite (not depicted) transmitting and/or receiving a GPS signal to/from the computing device 210. It will be understood that the present technology is not limited to GPS and may employ a positioning technology other than GPS. It should be noted that the GPS satellite can be omitted altogether.

According to the non-limiting embodiments of the present technology, the implementation of the computing device 210 is not particularly limited. For example, the computing device 210 could be implemented as a vehicle motor control unit, a vehicle CPU, a computer system built into the robotic vehicle 220, a plug-in control module, and the like. Thus, it should be noted that the computing device 210 may or may not be permanently associated with the robotic vehicle 220.

The computing device 210 can include some or all of the components of the computer system 100 depicted in FIG. 1, depending on the particular implementation of the present technology. In certain implementations, the computing device 210 is an on-board computer device and includes the processors 102, the storage device 125 and the memory 110. In other words, the computing device 210 includes hardware and/or software and/or firmware, or a combination thereof, for processing data and performing a variety of actions in response to the processed data. For example, the computing device 210 may receive data from one or more sensors and/or the server 235, process the received data, and trigger movement of the robotic vehicle 220 based on the processed data.

In some non-limiting implementations of the present technology, the communication network 240 is the Internet. In alternative non-limiting implementations of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the computing device 210 and the communication network 240, the implementation of which will depend, inter alia, on how the computing device 210 is implemented. Merely as an example and not as a limitation, the communication link can be implemented as a wireless communication link. Examples of wireless communication links may include, but are not limited to, a 3G communication network link, a 4G communication network link, and the like. The communication network 240 may also use a wireless connection with the servers 235.

In some implementations of the present technology, the servers 235 can be implemented as computer servers and could include some or all of the components of the computer system 100 of FIG. 1. In one non-limiting example, the servers 235 are implemented as a Dell™ PowerEdge™ Servers running the Microsoft™ Windows Server™ operating system but can also be implemented in any other suitable hardware, software, and/or firmware, or a combination thereof.

In some non-limiting implementations of the present technology, the processors 102 of the computing device 210 could be in communication with the servers 235 to receive one or more updates. Such updates could include, but are not limited to, software updates, map updates, route updates, geofencing updates, weather updates, and the like. In some non-limiting implementations of the present technology, the computing device 210 can also be configured to transmit to the servers 235 certain operational data, such as routes traveled, traffic data, performance data, and the like. Some or all such data transmitted between the robotic vehicle 220 and the servers 235 may be encrypted and/or anonymized.

It should be noted that a variety of sensors and systems may be used by the computing device 210 for gathering information about surroundings 250 of the robotic vehicle 220. The robotic vehicle 220 is equipped with a plurality of sensors (not numbered). It should be noted that different sensor systems may be used for gathering different types of data regarding the surroundings 250 of the robotic vehicle 220. It is contemplated that a plurality of different sensor systems may be used in combination by the robotic vehicle 220, without departing from the scope of the present technology.

In the non-limiting example illustrated in FIG. 2, the robotic vehicle 220 includes a LIDAR system 280 that mounted to the robotic vehicle 220 and communicatively coupled to the computing device 210. Broadly speaking, a LIDAR system is configured to capture data about the surroundings 250 of the robotic vehicle 220 used, for example, for building a multi-dimensional map of objects in the surroundings 250 of the robotic vehicle 220. More specifically, the LIDAR system 280 may determine location and distance of objects based reflection of transmitted light energy using pulsed laser light. Upon hitting an object with a transmitted lased pulse, the pulse is reflected back to a sensor of the LIDAR system 280. The object distance may then be calculated by measuring the pulse travel time. Typical LIDAR systems may generate rapid pulses of laser light at rates of up to several hundred thousand pulses per second. In most cases, the energy of automotive lidar beams is limited to eye-safe level of Class 1 laser product.

In at least some embodiments, the LIDAR system 280 comprises laser diodes to generate the laser beams, photodiodes to receive the returning (i.e. reflected) signals, and a servo-mounted mirror device to direct the laser beam horizontally and vertically. The generated laser pulses are guided through the mirror device actuated by a servo-motor. The mirror device may be adjusted to transmit pulses at different vertical and/or horizontal angles. An optical encoder provides feedback to the servo motor to enable precise control of the mirror and the resulting laser transmission. The returning signals are captured by the photodiodes and processed by a signal processing unit of the LIDAR system 280. The LIDAR system 280 may generate a series of point cloud data representative of the detected objects, with associated information about the measured distance and location in 3D coordinates relative to the LIDAR system 280.

In one embodiment, the LIDAR system 280 can be implemented as a rotational LIDAR system emitting sixty-four (64) light beams, however other configurations are envisioned without departing from the scope of the present technology. For example, one or more LIDAR systems could be mounted to the robotic vehicle 220 in a variety of locations and/or in a variety of configurations for gathering information about surroundings 250 of the robotic vehicle 220.

As alluded to above, the computing device 210 can be configured to detect one or more objects in the surroundings 250 of the robotic vehicle 220 based on data acquired from one or more camera systems and from one or more LIDAR systems. For example, the computing device 210 configured to detect a given object in the surroundings 250 of the robotic vehicle 220 may be configured to identify LIDAR data and camera data associated with the given object, generate an "embedding" representative of features associated with the given object, and detect the object by generating a bounding box for the object.

In the non-limiting example illustrated in FIG. 2, the robotic vehicle 220 includes radar systems 281 that are mounted to the robotic vehicle 220 and communicatively coupled to the computing device 210. Broadly speaking, the one or more radar systems may be configured to make use of radio waves to gather data about various portions of the surroundings 250 of the robotic vehicle 220. For example, the one or more radar systems may be configured to gather radar data about potential objects in the surroundings 250 of the robotic vehicle 220, such data potentially being representative of a distance of objects from the radar systems, orientation of objects, velocity and/or speed of objects, and the like.

More specifically, the radar systems 281 may employs radio waves, i.e. electromagnetic wavelengths longer than infrared light, to detect and track objects. Said radar systems 281 may emit pulses of radio waves that are reflected off objects surrounding the robotic vehicle 220, thereby causing returning waves providing information on the direction, distance and estimated size of each object in the surrounding of the robotic vehicle 220. The radar system 281 may also be used to determine a direction and speed of an object's movement by releasing multiple consecutive pulses. The radar system 281 may for example comprise two echo radar devices disposed in different positions on the robotic vehicle 220, such as to capture additional information on an object's position, such at an angle of the object. The radar system 281 may analyze wave phases (e.g. such as a Doppler radar) by keeping track of each particular wave and detecting differences in the position, shape, and form od the wave when it returns from the object to the radar system 281. The received information can further be used to determine whether the wave has undergone a positive or negative shift. A negative shift means that the object is most likely moving away from the radar system 281, while a positive shift indicates that the object is moving toward the radar system 281. A value of said shift may be used to determine the speed of the object.

In the non-limiting example illustrated in FIG. 2, the robotic vehicle 220 includes camera sensors 282 that are mounted to the robotic vehicle 220 and communicatively coupled to the computing device 210. Broadly speaking, the one or more camera sensors may be configured to gather image data about various portions of the surroundings 250 of the robotic vehicle 220. In some cases, the image data provided by the one or more camera sensors could be used by the computing device 210 for performing object detection procedures. For example, the computing device 210 could be configured to feed the image data provided by the one or more camera sensors to an Object Detection Neural Network (ODNN) that has been trained to localize and classify potential objects in the surroundings 250 of the robotic vehicle 220.

In some embodiments, one or more camera sensors may be equipped with fisheye lenses with a viewing angle of more than 180 degrees. It is contemplated that one or more camera sensors may be located on the robotic vehicle 220 and oriented in a manner that at least a portion of the robotic vehicle 220 is visible by the one or more camera sensors. In further embodiments, one or more camera sensors may be equipped with long-focus lenses. For example, a front-facing camera sensor may be equipped with such a lens for better "seeing" traffic lights on an opposite side of a street to be crossed.

In the non-limiting example illustrated in FIG. 2, the robotic vehicle 220 includes ultrasonic sensors 283 that are mounted to the robotic vehicle 220 and communicatively coupled to the computing device 210. Broadly speaking, an ultrasonic sensor is an instrument that measures the distance to an object using ultrasonic sound waves. Such sensors may include uses a transceiver to send and receive ultrasonic pulses that relay back information about an object's proximity. Sound waves produced by one or more ultrasonic sensors may reflect from boundaries to produce distinct echo patterns. In some embodiments, one or more ultrasonic sensors of the robotic vehicle 220 may provide an indication of a distance of a given object, and an echogram. It is contemplated that such information may be leveraged for adjusting action triggering thresholds depending on inter alia different weather conditions and road surfaces.

More specifically, ultrasonic sensors 283 may use these high frequency acoustic waves for object detection and ranging. In use, the ultrasonic sensors 283 transmit packets of waves and determine a travel time for said waves to be reflected on an object and return back to the ultrasonic sensors 283. In most cases, the acoustic waves used in ultrasonic sensors are non-audible to humans, because the waves are transmitted with high amplitude (>100 dB) for the sensors to receive clear reflected waves. In some implementations, the ultrasonic sensors 283 comprises a transmitter, which converts an electric alternating current (AC) voltage into ultrasound, and a receiver, which generates AC voltage when a force is applied to it.

In at least some embodiments, the robotic vehicle 220 further comprises an inertial measurement unit including motion sensors such as accelerometers (e.g. capacitive accelerometers, piezoelectric accelerometers, or any other suitable accelerometers), gyroscopes (e.g. mechanical gyroscopes, optical gyroscopes, Micro Electro-Mechanical System gyroscopes, or any other suitable gyroscopes) and magnetometers to determine a position and characteristics of movements of the robotic vehicle 220. For example, the inertial measurement unit may comprise three gyroscopes and three accelerometers providing six degree-of-freedom pose estimation capabilities. Additionally, the inertial measurement unit may comprise three magnetometers to provide a non degree-of freedom estimation.

Figure 4:
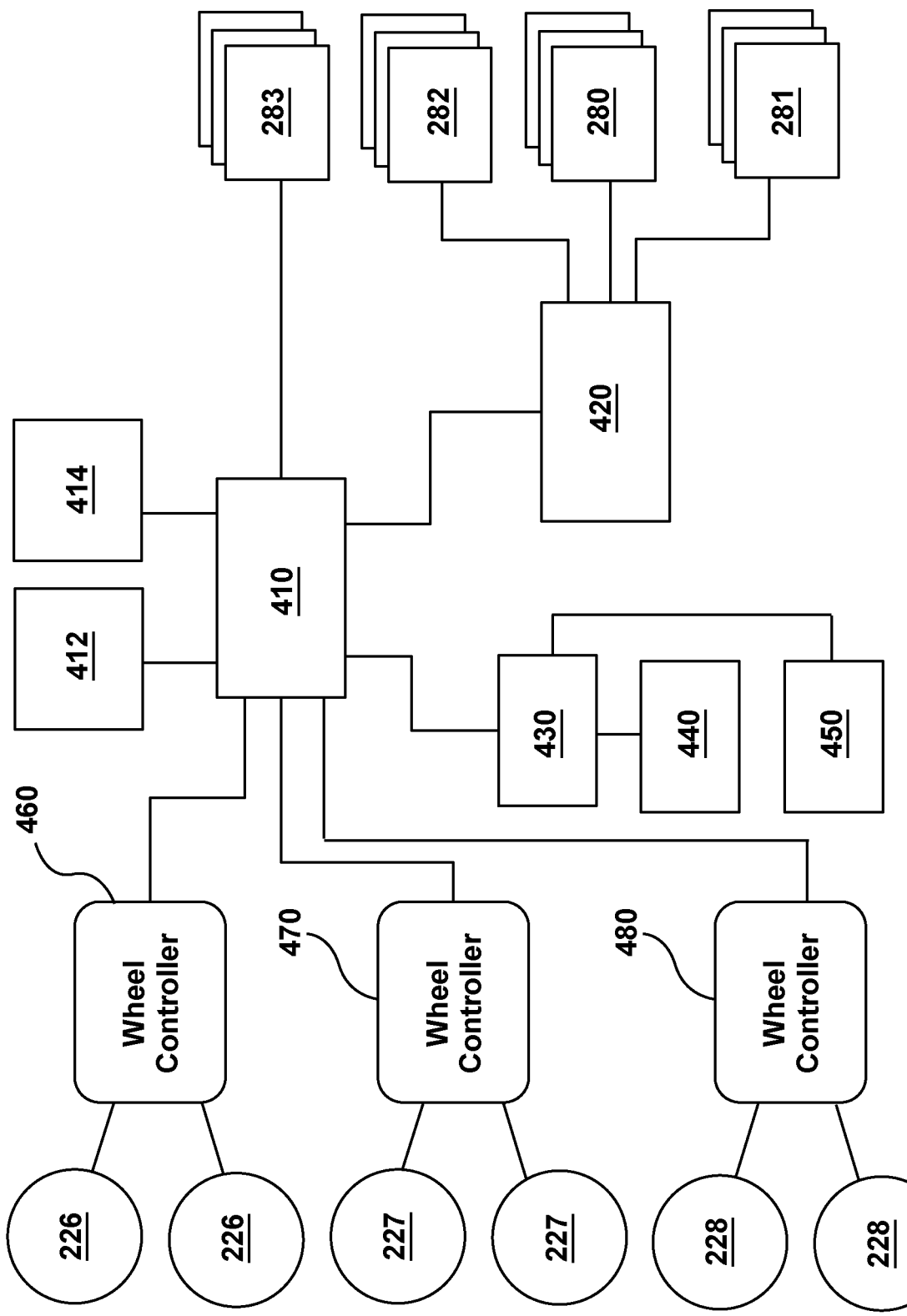
FIG. 4 is a schematic diagram of electronic components that can be used for operating the robotic vehicle.

With reference to FIG. 4, there is depicted a schematic diagram 400 of electronic components that can be used for operating the robotic vehicle 220. It is contemplated that the computing device 210 may include one or more electronic components including: a main controller 420, a platform controller 410, a peripheral controller 430, and a plurality of wheel controllers 460, 470, 480. In some alternative non-limiting embodiments, functionality of some or all of the computing device 210, the main controller 420, the platform controller 410, the peripheral controller 430, and the plurality of wheel controllers 460, 470, 480 may be combined into one or more computing devices.

The wheel controllers may be implemented as processors. It is contemplated that one or more electronic components of the robotic vehicle 220 may be located inside a common and/or respective sealed enclosures. In some implementations, communication between various electronic components may be provided via Controller Area Network (CAN) buses. In his embodiment, and in addition to the CAN buses, some communications between the various electronic components, and notably between the main controller 420 and the computing device 210, is based on Ethernet communication protocol. It is also contemplated that some electronic components may be provided power at voltage battery (VBAT), while other electronic components may be provided power at 12 volts. Furthermore, transmission of information among the various electronic component involves signal converters for converting information received at one of the electronic components in a suitable format (e.g. digital signals, discrete signals and/or analog signals).

Broadly speaking, the main controller 420 is in a sense the "brain" of the robotic vehicle 220. The main controller 420 is a computer system configured to execute one or more computer-implemented algorithms for recognizing objects (such as people, cars, obstacles, for example), plan trajectory of movement of the robotic vehicle, localize the robotic vehicle 220 in its surroundings, and so forth. The main controller 420 may comprise a router through which other components can be connected to a single on-board network. In one implementation, video data from camera sensors 282, LIDAR data from the LIDAR system 280, and radar data from the radar systems 281 may be provided to the main controller 420.

Broadly speaking, the platform controller 410 is configured to power one or more electronic components of the robotic vehicle 220. For example, the platform controller 410 may be configured to control current limits on respective power branches, switch power to an auxiliary electrical power source 414 when a main electrical power source 412 is removed and/or is being replaced. Said electrical power sources 414, 412 may be for example batteries. It is also contemplated that the platform controller 410 may be configured to generate wheel control commands and collect data from the ultrasonic sensors 283. Alternatively, ultrasonic data may be collected by one or more other controllers inside the robotic vehicle 220 without departing from the scope of the present technology.

Broadly speaking, the peripheral controller 430 is configured to control one or more peripheral systems of the robotic vehicle 220. For example, the peripheral controller 430 may be configured to control a lid system 440 and a lighting system 450 of the robotic vehicle 220. More specifically, the lid system 440 comprises the lid 223 and a motor operatively connected to the lid 223. The lid system 440 may also comprise sensors to detect movement values of the lid 223, such as an angular position of the lid 223, a rotation speed of the motor of the lid 223, and/or any other information relative to actuation of the lid 223. As such, the peripheral controller 430 may for example control the motor of the lid 223 to lock and unlock the lid 223. The lighting system 450 comprises the illumination/signaling elements 284, 285 and 286 that are used for providing visual information to person(s) in the surroundings of the robotic vehicle 220. As such, the peripheral controller 430 may for example control visual signals provided by the one or more visual indications (e.g. illumination/signaling elements 284, 285 and 286) of the robotic vehicle 220.

Broadly speaking, the wheel controllers 460, 470 and 480 are configured to control operation of respective wheels of the robotic vehicle 220. In some embodiments, the robotic vehicle 220 may comprise motor-wheels (or "in-wheel motors") for driving the wheels. More specifically, each motor-wheel operates a corresponding wheel and is implemented into a hub of the corresponding wheel to drive said wheel directly. The motor-wheels may be implemented in the robotic vehicle instead of a motor located inside the body 222. In this embodiment, each wheel comprises an electronic unit, said electronic unit comprising a processor that may be communicably connected to the computing device 210, a microcontroller (e.g. a corresponding motor-wheel) connected to said processor, or any other computing device. Implementation of the motor-wheels may provide more room in the body 222 and may reduce risk of over-heating other components inside the body 222 due to thermal energy expelled by the motor. For example, a given wheel controller may receive speed values for respective wheels from the platform controller 410 and may control currents in the windings of the motor-wheels, for example, so as to provide the desired speed in a variety of driving conditions.

Robotic Vehicle Operation

At least some aspects of the present technology may provide navigation and/or motion planning for operating the robotic vehicle 220 in the surroundings 250 and which includes both static and dynamic (i.e., moving) objects. The robotic vehicle 220 may navigate and move in urban and/or suburban settings for delivering goods, packages, boxes, and/or other parcels. The robotic vehicle 220 may navigate in outdoor environments (e.g. streets, crosswalks, field). Because of the tasks that it performs, the robotic vehicle 220 may be configured to travel along sidewalks and footways. Thus, the motion planning module in the robotic vehicle considers the behavior of pedestrians moving along or crossing its path. Additionally, the robotic vehicle 220 may cross roads. Cars and other vehicles moving on roads in urban and/or suburban settings may not notice small-sized robotic vehicles, for example, which may lead to collisions that could damage or destroy the robotic vehicle 220 and its cargo. Consequently, the motion planning module for the robotic vehicle 220 may consider objects in a roadway, including, e.g. moving and parked cars and other vehicles.

The robotic vehicle 220 may also navigate in indoor environments such as offices, warehouses, convention centers, or any other indoor environments where the robotic vehicle 220 is requested to navigate. Thus, the motion planning module in the robotic vehicle considers the behavior of human entities and non-human entities (e.g. animals) moving along or crossing its path.

For a delivery vehicle, one important goal may be to deliver a parcel from a starting point to a destination by a particular time. Thus, the motion planning module may consider the speed of the robotic vehicle 220 and determine that adequate progress is being made toward the destination.

These considerations are particularly relevant when the delivery tasks are time-critical or when the destination is remote.

For purposes of illustration, the robotic vehicle 220 uses the LIDAR system 280. The computing device 210 associated with the robotic vehicle 220 receives data from the sensors and may generate a 3D map of points (point cloud). This 3D map of points may be used by the robotic vehicle to inter alia obtain a distance from surrounding objects and to determine a trajectory and speed.

It is contemplated that the robotic vehicle 220 may also make use of a 3D map representation that is provided thereto by the servers 235. For example, the 3D map representation of an environment in which the robotic vehicle 220 is to operate may be "built" on the servers 235 and may be accessible remotely by the robotic vehicle 220, without departing from the scope of the present technology. Additionally, or alternatively, the 3D map representation of the environment may also be transmitted, at least in part, to the robotic vehicle 220 for local storage and local access purposes.

It should be noted that the servers 235 may collect information from one or more robotic vehicles (e.g., a fleet) that are tasked with mapping the environment, thereby generating respective 3D map representations of a given region. For example, one or more robotic vehicles may generate a 3D map representation of a street, a block, a municipality, a city, and a like. This information may be collected by the servers 235 for unifying information from the one or more robotic vehicles into a 3D map representation to be used during operation of the robotic vehicle 220. It is contemplated that a 3D map representation used by the robotic vehicle 220 for navigation and motion planning may have a system of coordinates for locating various objects found in the environment such as poles, mailboxes, curbs, roads, buildings, fire hydrants, traffic cones, traffic lights, crosswalks, trees, fences, billboards, landmarks, and the like. As another example, the one or more robotic vehicles may generate a 3D map representation of an office, one or more floors of a building, a mall, a convention center, a warehouse, a datacenter or any other indoor environments suitable for navigation of the one or more robotic vehicles. It is contemplated that a 3D map representation used by the robotic vehicle 220 for navigation and motion planning may have a system of coordinates for locating various objects found in the environment such as furniture, doors, racks, stairs, staircases, shops, elevators, and the like.

Lid Operation

Figure 5:
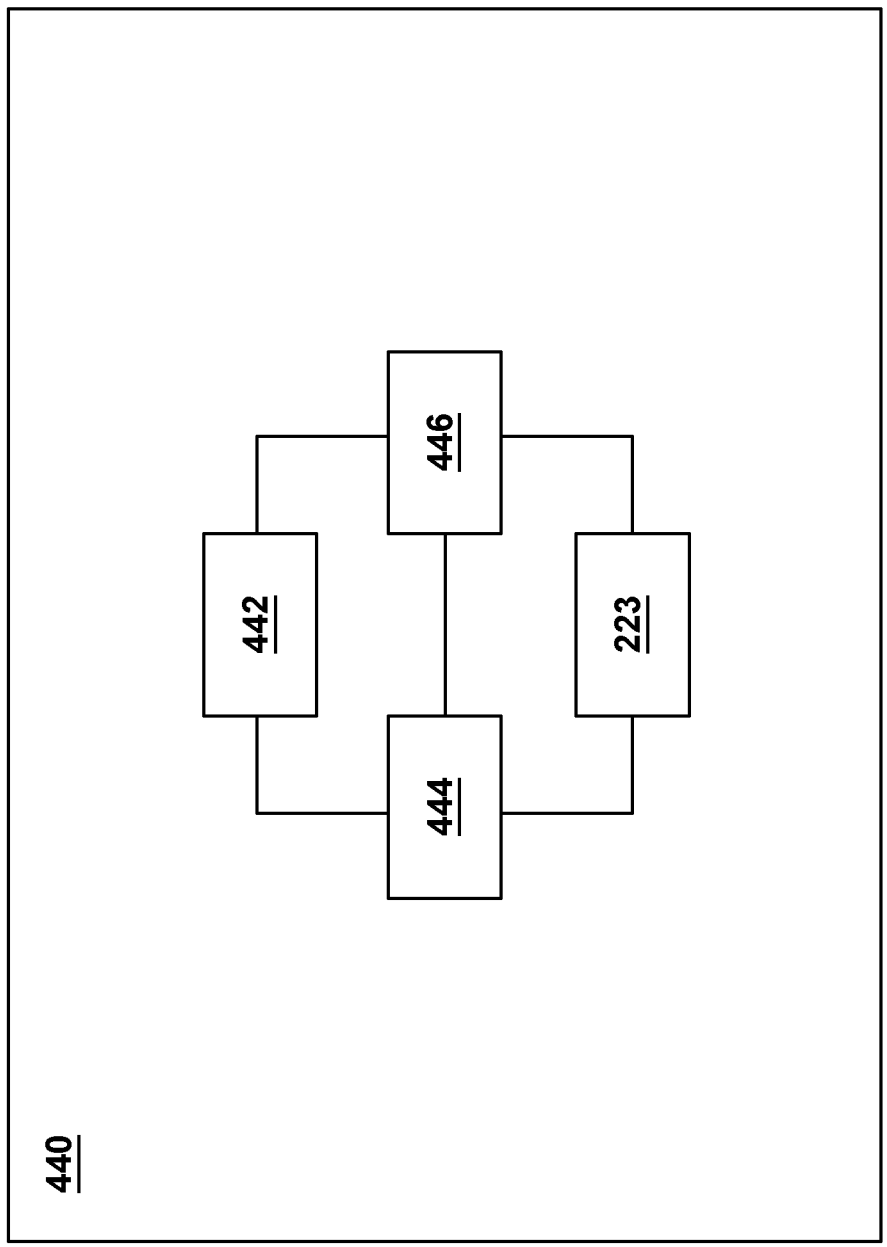
FIG. 5 is a schematic diagram of a lid system of the robotic vehicle.

With reference to FIG. 5, the lid system 440 comprises, in the illustrated non-limiting embodiment, a processor 442, a motor 444, an encoder 446 and the lid 223. For example, the processor 442 may be implemented in a similar manner to the processors 102. The lid system 440 may also comprise a lid rotation shaft 605 (see FIG. 6), enabling the motor 444 to drive rotation of the lid 223. Assembly of the processor 442, the encoder 446 and the motor 444 coupled with the lid rotation shaft 605 may be referred to as a "lid controller mechanism".

The motor 444 may be any motor suitable for providing rotation of the lid 223. The motor 444 may be, for example and without limitation, an icon core motor, a brushless motor or a coreless motor. The motor 444 may be provided with electric current from the main electrical power source 412 or the auxiliary electrical power source 414. Provision of electric current to the motor 444 may be orchestrated by the processor 442. The motor 444 may be for example receiving DC electric current, values of said DC electric current being controlled by the processor 442. In one implementation, the motor 444 is a TWIRL PG45775 series Gearmotor consisting of 45 mm PG45 series planetary gearbox and 42 mm RS775 series brushed motor.

The encoder 446 may be any hardware device or software suitable for assigning a code to represent data relative to a movement value of the lid 223. For example, said movement value may be representative of an angular position of the lid 223 with respect to a reference position, a rotational speed of the lid around the lid rotation shaft 605, a rotational acceleration of the lid around the lid rotation shaft 605 or any other information. In at least some embodiment, the encoder 446 is a TWIRL ME775 magnet encoder. It is contemplated that an encoder may be an integral component of a motor used to drive the lid 223, without departing from the scope of the present technology.

Figure 6:
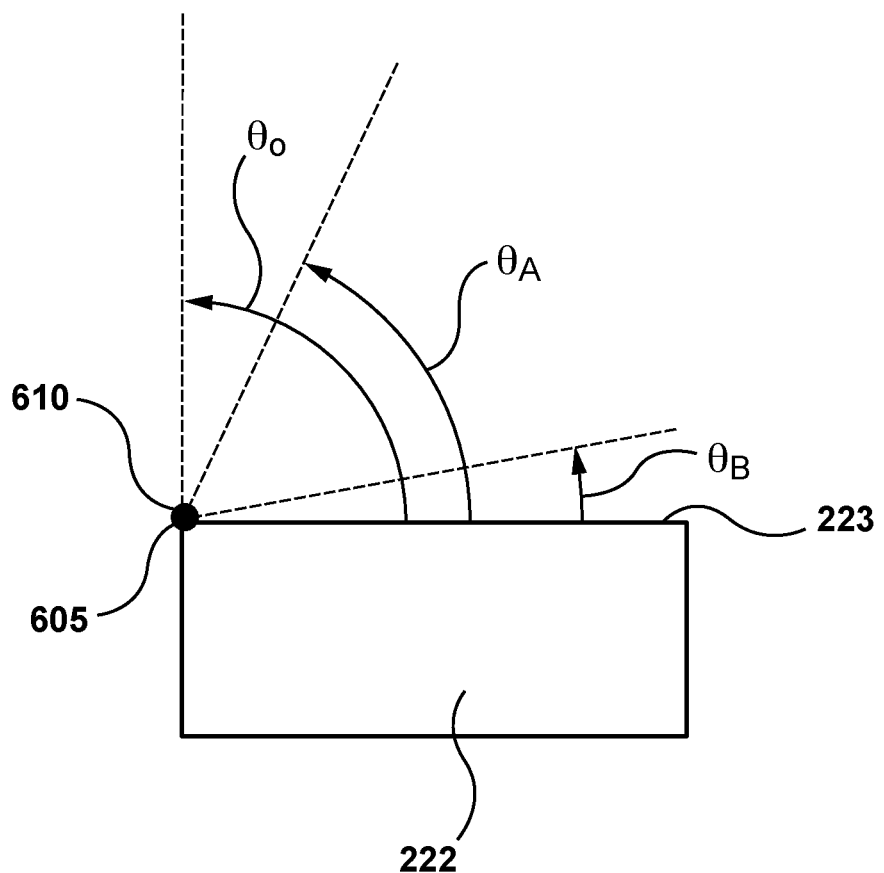
FIG. 6 depicts different ranges of positions of a lid of the robotic vehicle with respect to a interior storage space thereof.

As best shown on FIG. 6, a rotation axis 610 of the lid 223 is defined by a direction in which the lid rotation shaft 605 extends. In this embodiment, the rotation axis 610 is orthogonal to a gravity axis. It can be said that the lid 223 is rotated about a horizontal axis, as opposed to a vertical axis, for example. As it will be discussed in greater details herein further below, due to the lid 223 rotating about a horizontal axis, gravitational force may affect the rotation of the lid 223. An angular position of the lid 223 around the axis 610 is defined by the angle $\theta$, where the angle may vary in an angular range from $\theta=0$ to $\theta=\theta_0$. More specifically, $\theta=0$ corresponds to a close configuration of the lid 223, the opening 309 being closed by the lid 223. In other words, the interior storage space 307 is sealed when $\theta=0$.

In this embodiment, a rotation of the lid 223 around the axis 610 is divided in three phases. In other words, the angular range of 0 comprises three angular sub-ranges: $0<\theta<\theta_B$, $\theta_B<\theta<\theta_A$, $\theta_A<\theta<\theta_0$. For clarity purposes, a first phase of the movement of the lid 223 refers to the lid 223 moving from $\theta_0$ to $\theta_A$, a second phase refers to the lid 223 moving from $\theta_A$ to $\theta_B$ and a third phase refers to the lid 223 moving from $\theta_B$ to 0. More specifically, in this embodiment, $\theta_B$ is equal to 10°, $\theta_A$ is equal to 500 and $\theta_0$ is equal to 90°. Different number of angular sub-ranges (i.e. phases of rotation of the lid 223) and/or different values for $\theta_B$, $\theta_A$, and $\theta_0$ are contemplated in alternative embodiments.

It should be understood that, due to the fact that the rotation axis 610 is orthogonal to the gravity axis, a coupling force exerted by the motor 444 to rotate the lid 223 around the rotation axis 610 counterbalances, at least in part, a weight of the lid 223 during an opening of the lid 223.

Developers of the present technology have realized that external environmental forces may exert resistance to a movement of the lid 223. For example, the gravitational force may cause a first environmental-based torque onto the lid 223. Said torque exerted by the gravitational force 720 depends at least on an orientation (angular position) of the lid 223 around the rotation axis 610. More specifically, the torque resulting from the gravitational force 720 increases when $\theta$ decreases.

Figure 7:
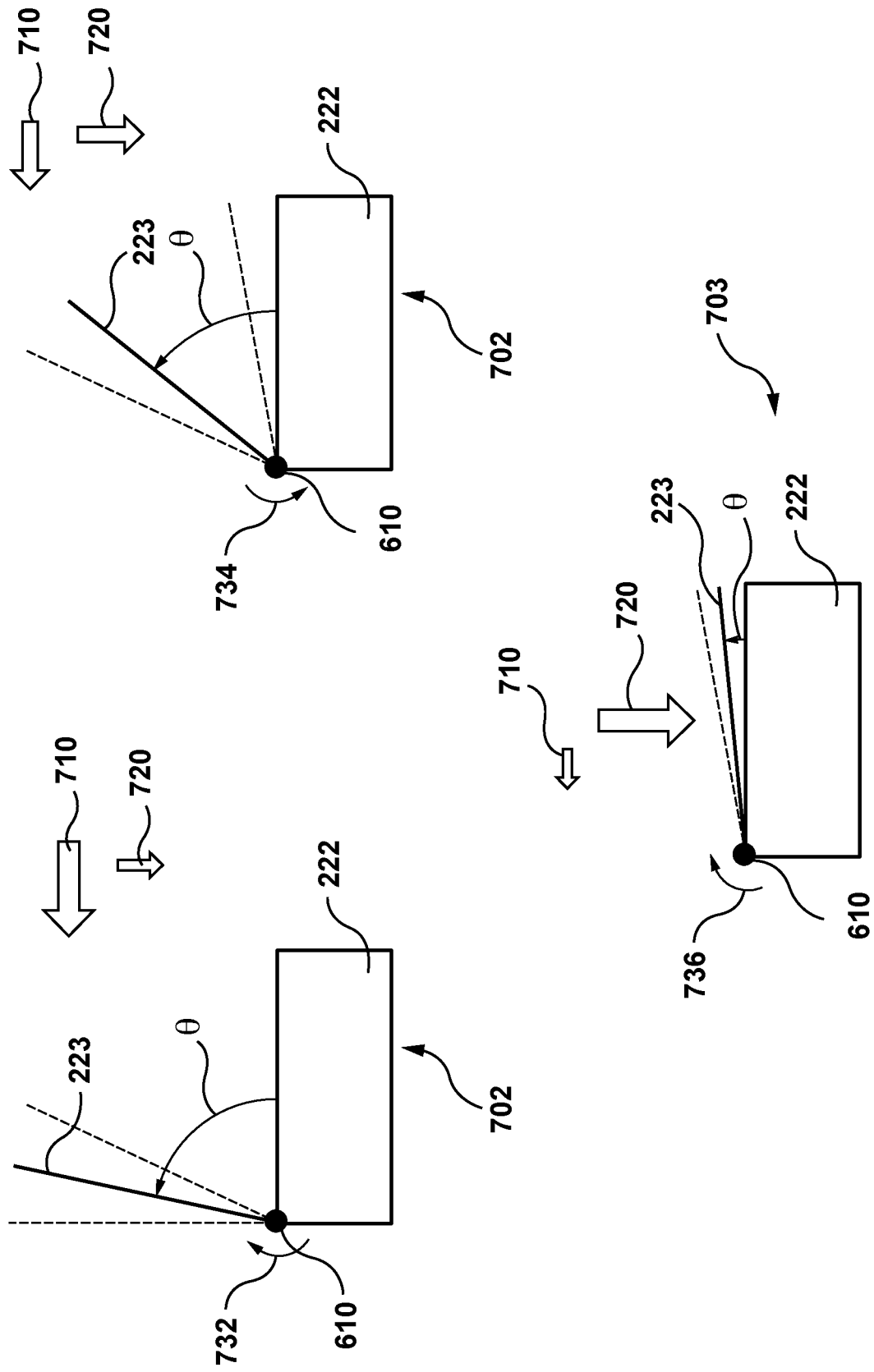
FIG. 7 depicts the lid in the different ranges of positions of FIG. 6.

As another example, wind load may cause a second environmental-based torque onto the lid 223. The torque exerted by the wind load 710 depends at least on an effective surface of the lid 223, or "wind surface area", corresponding to a surface of the lid exposed to the wind load. In the configurations of representations 701, 702 and 703, said effective surface is a projection of the lid 223 on a vertical plane parallel to the rotation axis 610. As such, the torque exerted by the wind load 710 varies with the angle $\theta$. More specifically, torque exerted by the wind load 710 decreases when $\theta$ decreases. With reference to FIG. 7, representations

701, 702 and 703 depicts coupling forces exerted by the motor 444 on the lid 223 for the three different phases of rotation of the lid 223.

First Phase of the Rotation from $\theta=\theta_0$ to $\theta=\theta_A$

On representation 701, the lid is being rotated from $\theta=\theta_0$ to $\theta=\theta_A$. In this phase, developers of the present technology have realized that the first environmental-based torque is directed in the same direction than a current rotation of the lid 223 (i.e. clockwise in representation 701). However, the second environmental-based torque is directed in a direction opposed to a current rotation of the lid 223 (i.e. counter-clockwise in representation 701). In other words, the wind load 710 counteracts rotation of the lid 223 from $\theta=\theta_0$ to $\theta=\theta_A$. Given a relative difference of norms of the environmental-based torques, a resulting environmental-based torque counteracts rotation of the lid 223 from $\theta=\theta_0$ to $\theta=\theta_A$.

Therefore, in order to effectively cause the lid 223 to rotate in the first phase of the rotation, the motor 444 receives a first current having a first value from an electrical power source (e.g. the main electrical power source 412) to exert a first coupling force 732 to rotate the lid toward $\theta=\theta_A$. As such, the first coupling force 732 has a clockwise direction in representation 701 to counteract the wind load 710 in the first phase of the phase of the rotation of the lid 223.

Second Phase of the Rotation from $\theta=\theta_A$ to $\theta=\theta_B$

Referring now to representation 702, the lid 223 enters in the second phase of its rotation around the rotation axis 610. In this phase, the lid is being rotated from $\theta=\theta_A$ to $\theta=\theta_B$. Developers of the present technology have realized that the first environmental-based torque has increased relatively to the first phase and that the second environmental-based torque has decreased relatively to the first phase. More specifically, the resulting environmental-based torque causes the lid 223 to rotate from $\theta=\theta_A$ to $\theta=\theta_B$.

Therefore, in order to effectively cause the lid 223 to rotate in the second phase of the rotation, the motor 444 receives a second current having a second value from an electrical power source (e.g. the main electrical power source 412) to exert a second coupling force 734 in an opposite direction of the first coupling force 732 to at least partially counteract the gravitational force. As such, the second coupling force 734 has a counter-clockwise direction in representation 702. It can be said that, during the second phase, the rotation of the lid 223 performed in a controlled manner in which the gravitational force 720 is used to rotate the lid 223.

Third Phase of the Rotation from $\theta=\theta_B$ to $\theta=0$

Referring now to representation 703, the lid 223 enters in the third phase of its rotation around the rotation axis 610. In this phase, the lid is being rotated from $\theta=\theta_B$ to $\theta=0$. Developers of the present technology have realized that the first environmental-based torque has further increased relatively to the second phase and that the second environmental-based torque has further decreased relatively to the second phase. More specifically, the resulting environmental-based torque causes the lid 223 to rotate from $\theta=\theta_B$ to $\theta=0$.

In order to effectively close the lid 223, the motor 444 receives a second current having a second value from an electrical power source (e.g. the main electrical power source 412) to exert a third coupling force 736 in a same direction of the first coupling force 732 (i.e. clockwise in the representation 703) on the lid 223 for closing the lid 223. Once the lid 223 is closed (i.e. $\theta=0$), a locking system may maintain the lid 223 in a closed position. The locking system may be for example and without limitation, a mechanical locking system or a magnetic locking system. In an alternative embodiment, the motor 444 may exert a continuous coupling force to maintain the lid 223 in the closed position.

Figure 8:
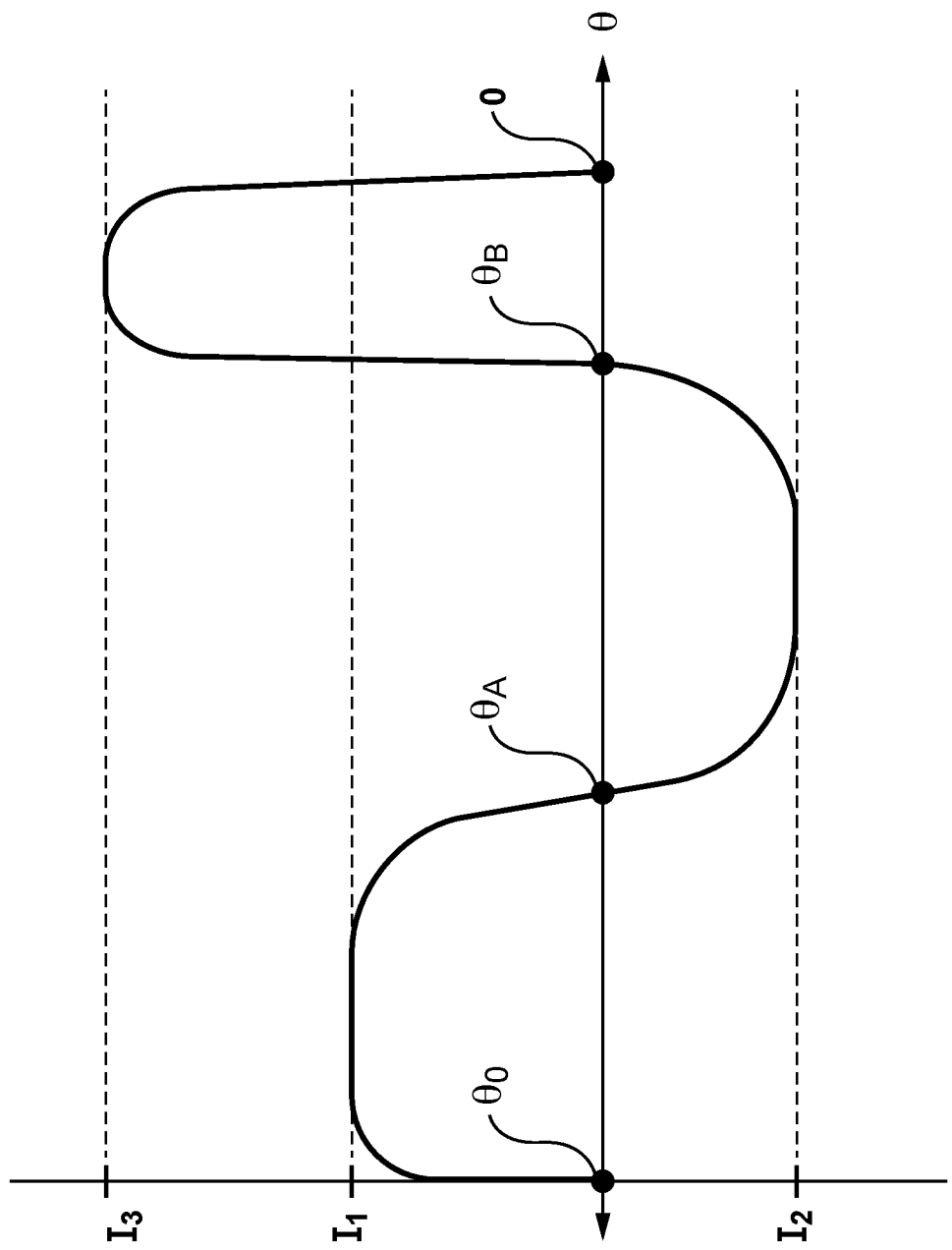
FIG. 8 depicts an electric current provided to a motor of the lid according to an angular position of the lid in accordance with some embodiments of the present technology.

Summarily, it can be said that an orientation of the coupling force of the motor 444 exerted on the lid 223 at the rotation axis is alternated during a rotation of the lid 223 from $\theta=\theta_0$ to $\theta=0$. FIG. 8 depicts said alternation of the orientation of the coupling force by illustrating an evolution of the electric current "I" provided to the motor 444 for operating the lid 223 as a function of the angle $\theta$. In order to ease an understanding of FIG. 8, a reader of the present disclosure should note that description of FIGS. 7 and 8 refer to a closing of the lid 223. As such, FIG. 8 should be reed from high values of $\theta$ to low values of $\theta$. Opening of the lid 223 (i.e. $\theta$ varying from κ to $\theta_0$) will be described in greater details herein further below.

In the first phase of the movement, the electric current I has a first value $I_1$, $I_1$ being positive in this embodiment, thereby causing the first coupling force 732 to be clockwise in the illustrative example of representation 701. The value of $I_1$ may be, for example and without limitation, 1.1 A. Once the angle $\theta$ has reached $\theta_A$, the sign of the electric current is changed such that the electric current I has a second value $I_2$ in the second phase. The encoder 446 may send, upon determining that $\theta$ has reached $\theta_A$, a notification to the processor 442 such that the processor 442 may cause modification of the electric current I. Change of the sign of the electric current I between the first and second phases causes the coupling force to change its orientation around the rotation axis 610. Broadly speaking, a positive value of the electric current I results in a coupling force exerted on the lid 223 having a first orientation, and an opposite value of the electric current I results in a coupling force exerted on the lid 223 having a second orientation opposed to the first orientation.

$I_2$ is negative in this embodiment, thereby causing the second coupling force 734 to be counter-clockwise in the illustrative example of representation 702. The value of $I_2$ may be, for example and without limitation, −0.8 A. Once the angle $\theta$ has reached $\theta_B$, the sign of the electric current is further changed such that the electric current I has a third value $I_3$ in the third phase. Again, change of the sign of the electric current I between the second and third phases causes the third coupling force 736 to have an orientation opposed to the orientation of the second coupling force 734 around the rotation axis 610. $I_3$ is positive in this embodiment, thereby causing the third coupling force 736 to be clockwise in the illustrative example of representation 703. In at least some embodiments, $I_1$ is lower than $I_3$, such that the first coupling force 723 is smaller than the third coupling force 736. The value of $I_3$ may be, for example and without limitation, 2.2 A.

Figure 9:
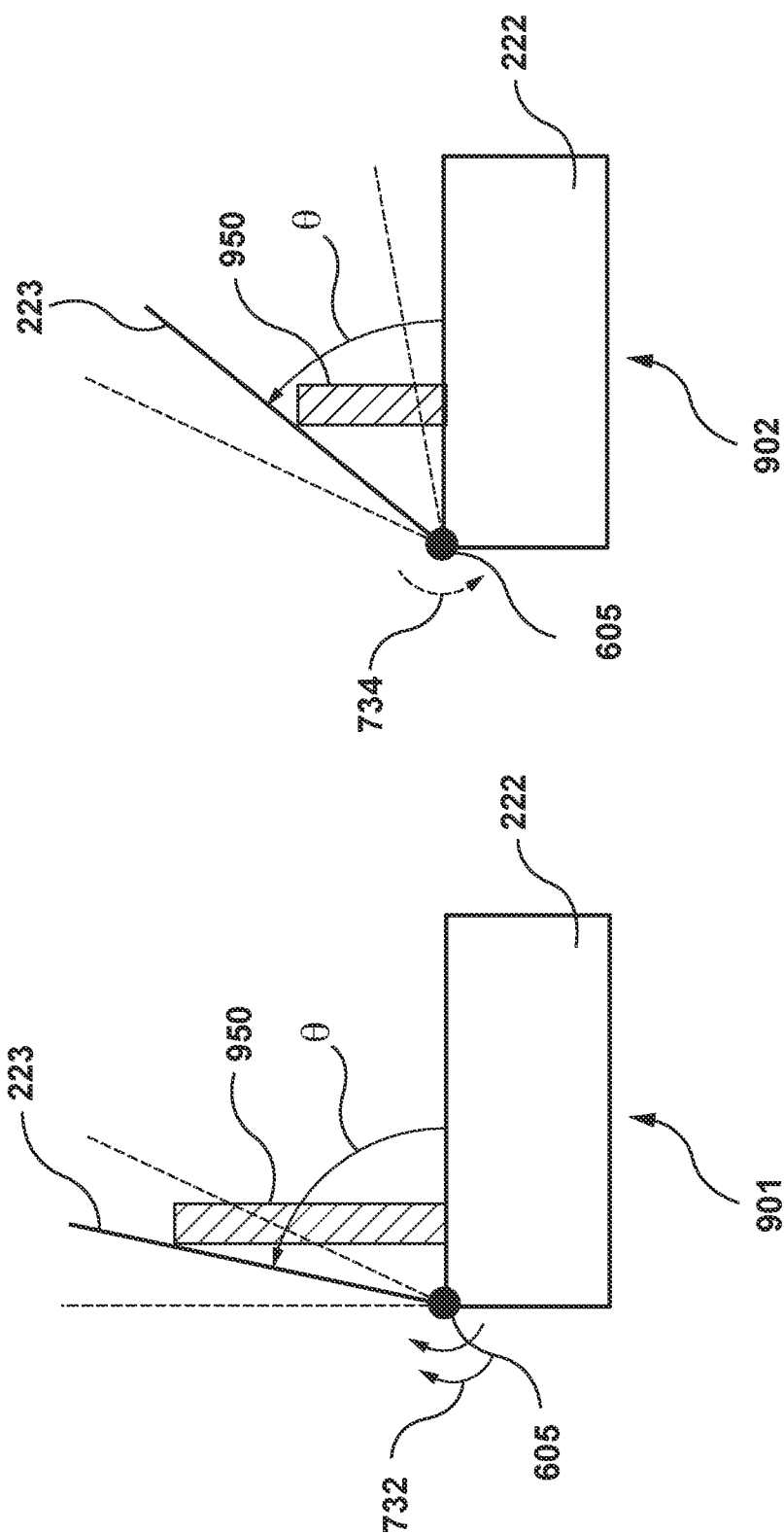
FIG. 9 depicts movements of the lid in two respective positions with an obstacle obstructing said movement.

With reference to FIG. 9, representation 901 depicts the lid 223 having its movement obstructed by an obstacle 950 (e.g. an item or human body part), the lid 223 being in the first phase of the rotation around the rotation axis 610 (i.e. $\theta_A<\theta<\theta_0$). In this embodiment, the processor 442 may determine, based on information provided by the encoder 446 about one or more movement values, that the movement of the lid 223 is dampened or even blocked.

More specifically, the processor 442 may monitor a movement value of the lid 223 such as, for example and without limitation, a position of the lid 223, a rotation speed of the lid 223, an acceleration of the lid 223, and/or any other information relative to actuation of the lid 223. In response to the movement value being below a pre-determined threshold, the processor 442 may cause a modification of the electric current I to increase a coupling force applied to the lid 223 in a current rotation direction.

As such, in the first phase, the processor 442 may cause the first value $I_1$ of the electric current to increase to an increased first value. If the movement value is still below the pre-determined threshold when the increased first value reaches first threshold $I_{TH1}$, the processor 442 triggers an emergency action. The first threshold $I_{TH1}$ is described in greater details herein further below. It should be noted, that, in this embodiment, increase a coupling force applied to the lid 223 in a current rotation direction while the lid 223 being in the first phase corresponds to increasing an absolute value of the first coupling force 732. The increased first coupling force 732 is illustrated as a double arrow to illustrate an increase of the absolute value thereof.

The same operations may be applied to the third phase of the rotation. More specifically, in response to determining that the rotation is dampened or blocked, the processor 442 may cause a third value $I_3$ of the electric current to increase to an increased third value. If the movement value is still below the pre-determined threshold when the increased third value reaches a third threshold $I_{TH3}$, the processor 442 triggers an emergency action. However, these operations in the third phase of rotation may be omitted in at least some embodiments of the present technology.

Representation 902 on FIG. 9 depicts the lid 223 having its movement obstructed by the obstacle 950, the lid 223 being in the second phase of the rotation around the rotation axis 610 (i.e. $\theta_B < \theta < \theta_A$). In response to determining that the movement of the lid 223 is dampened or blocked in the second phase, the processor may cause a modification of the electric current I to increase a coupling force applied to the lid 223 in a current rotation direction. As such, in the second phase, the processor 442 may cause the electric current to decrease from the second value $I_2$ to a decreased second value. If the movement value is still below the pre-determined threshold when the decreased second value reaches a second threshold $I_{TH2}$, the processor 442 triggers an emergency action. The second threshold $I_{TH2}$ is described in greater details herein further below. It should be noted, that, in this embodiment, increasing a coupling force applied to the lid 223 in a current rotation direction while the lid 223 being in the second phase corresponds to reducing an absolute value of the second coupling force 734. The second coupling force 734 is illustrated in dashed line to illustrate a reduction of the absolute value thereof.

In this embodiment, upon triggering the emergency action, the processor may cause the motor 444 to receive, from the electrical power source a fourth electric current for exerting a fourth coupling force on the lid in order to rotate the lid 223 in an opposite direction to a current rotation direction. As a result, the lid 223 is opened to prevent the lid 223 and/or the obstacle 950 from being damaged. As an example, in response to the emergency action being triggered in the first of third phase, the fourth coupling force is exerted in a direction opposed to the first and third coupling forces 732, 736. In response to the emergency action being triggered in the second phase, the fourth coupling force is exerted in a same direction than the second coupling force 734. In the same or another embodiment, the processor 442 may cause the motor 444 to immobilize the lid 223 in a pre-determined position. For example, said pre-determined position may be a current position, or a position where $\theta=0$0.

In an alternative embodiment, upon triggering the emergency action, the processor 442 cause the lid 223 to rotate back and forth for a pre-determined amount of times. In other words, if determination is made that the emergency action is triggered when the lid 223 is in a given angular position, the processor 442 causes the lid 223 to rotate in an opposite direction by a pre-determined amount of degrees, and rotate back in the original rotation direction. If the rotation is still dampened or blocked by the obstacle 950, the processor causes the lid 223 to repeat such back and forth movement for a pre-determined amount of times (e.g. three times). If the rotation is yet still dampened or blocked by the obstacle 950 at the given angular position, the processor 442 may cause the motor 444 to immobilize the lid 223.

Figure 10:
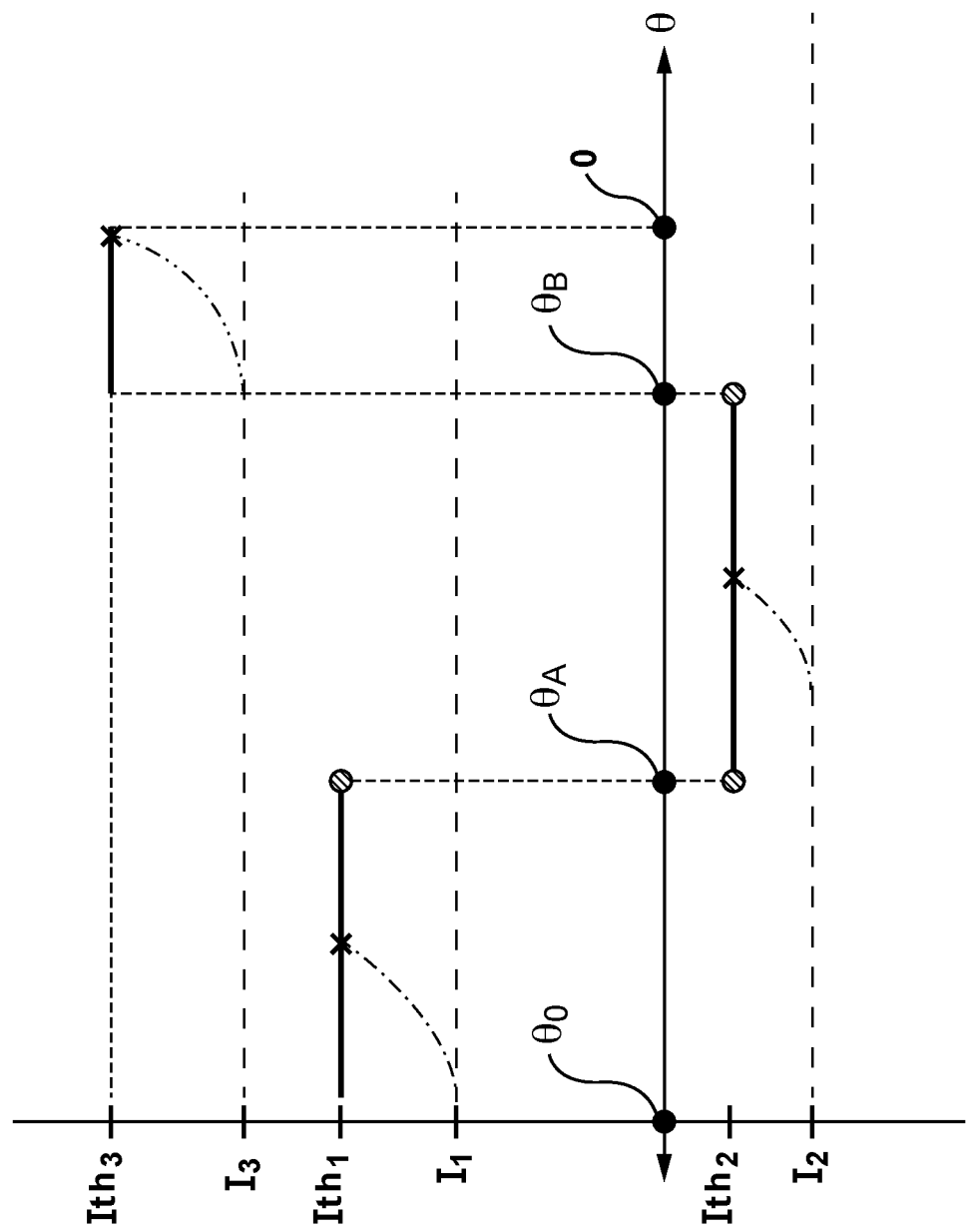
FIG. 10 depicts threshold of the electric current provide to the motor of the lid set in accordance with some embodiments of the present technology.

FIG. 10 illustrates positions of the first, second and third thresholds $I_{TH1}$, $I_{TH2}$ and $I_{TH3}$ with respect to the nominal values $I_1$, $I_2$ and $I_3$. More specifically, an absolute value of the first threshold $I_{TH1}$ is higher than an absolute value of $I_1$, the first threshold $I_{TH1}$ having a same sign than $I_1$. Similarly, an absolute value of the third threshold $I_{TH3}$ is higher than an absolute value of $I_3$, the third threshold $I_{TH3}$ having a same sign than $I_3$. Finally, an absolute value of the second threshold $I_{TH2}$ is lower than an absolute value of $I_2$, the second threshold $I_{TH2}$ having a same sign than $I_2$. Variation of the electric current from one of its nominal values $I_1$, $I_2$ and $I_3$ toward one of the respective thresholds $I_{TH1}$, $I_{TH2}$ and $I_{TH3}$ may be temporally linear, incremental, exponential, or having any known or custom function as a function of time. The values of the thresholds $I_{TH1}$, $I_{TH2}$ and $I_{TH3}$ may be, for example and without limitation, 2.7 A, –0.1 A and 2.7 A respectively.

Figure 11:
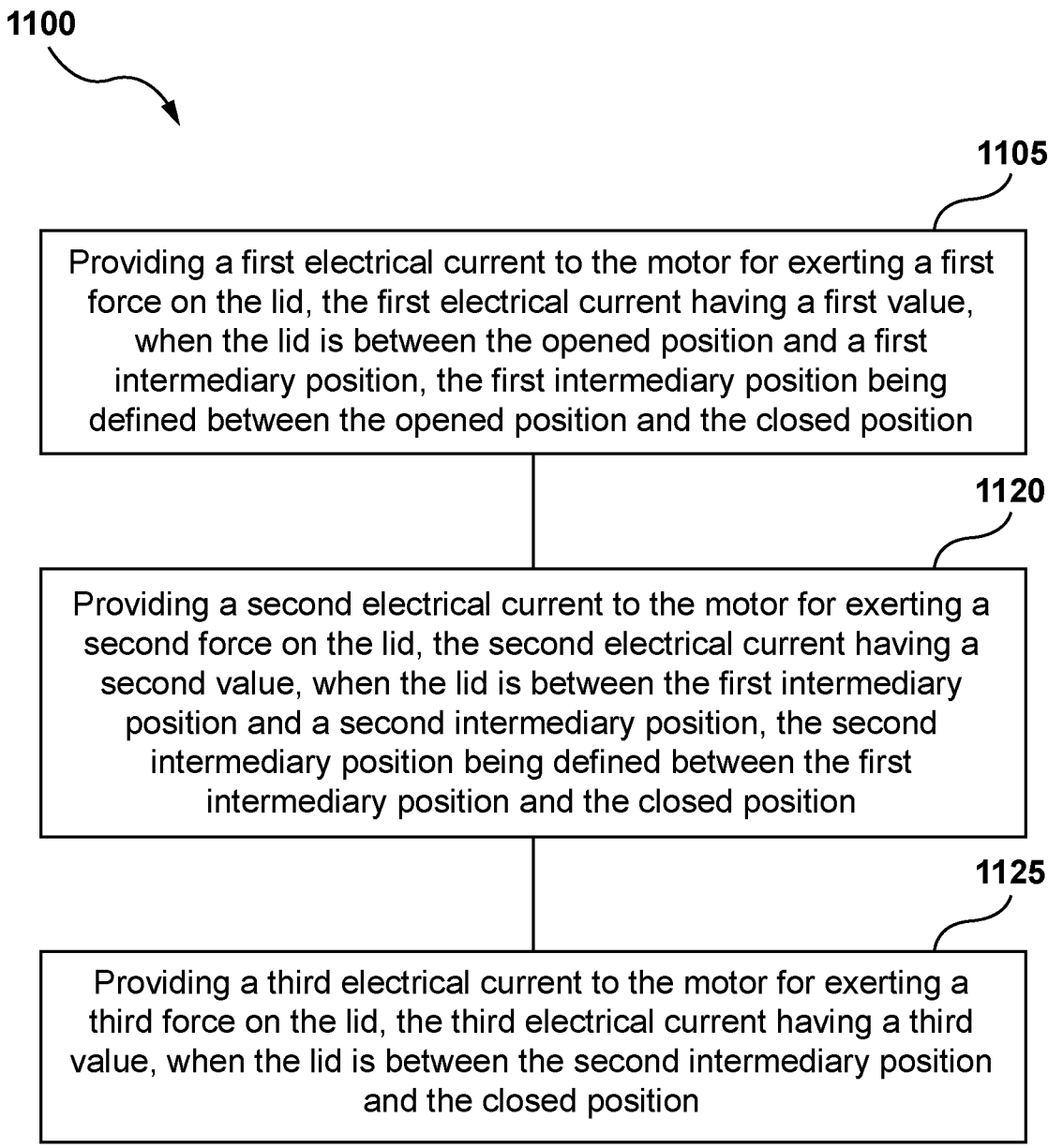
FIG. 11 shows a flowchart of a method performed in accordance with various implementations of the disclosed technology.

FIG. 11 is flow diagram of a method 1100 for operating a lid, such as the lid 223, of a robotic vehicle, according to some embodiments of the present technology. The lid provides access to an interior space of the robotic vehicle in an opened position and prevents access to the interior space in a closed position, the lid being operable by a motor, such as motor 444 for moving the lid between the opened position and the closed position In one or more aspects, the method 1100 or one or more steps thereof may be performed by a computing device, such as the processor 442. The method 1100 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 1105: Providing a First Electric Current to the Motor for Exerting a First Force on the Lid, the First Electric Current Having a First Value The method 1100 comprises providing, at step 1105, a first electric current to the motor for exerting a first force on the lid, the first electric current having a first value (e.g. $I_1$) when the lid is between the opened position and a first intermediary position, the first intermediary position being defined between the opened position and the closed position. Said first force may be a coupling force resulting in rotation of the lid around a rotation axis. In this embodiment, the opened position corresponds to $\theta=\theta_O=90$ degrees with respect to a horizontal plane (or 0 degrees with respect to a vertical plane) and the first intermediary position corresponds to $\theta=\theta_A=50$ degrees with respect to a horizontal plane.

In at least some embodiments, the robotic vehicle further comprises an encoder communicably connected to the processor. The processor monitors a movement value of the lid via information provided by the encoder. Said movement value comprises information about of current movement of the lid such as an angular position of the lid, a rotation speed of the motor of the lid, an acceleration of the lid and/or any other information relative to actuation of the lid.

In this embodiment, during the first phase and in response to the movement value being below a first pre-determined movement value (e.g. due to dampening or blockage of the rotation by an obstacle), the processor may increase the first value of the first electric current to an increased first value for exerting an increased first force on the lid. An absolute value of the increased first value is above an absolute value of the first value.

Furthermore, in response to the increased first value being equal to a first threshold value (e.g. $I_{TH1}$), the processor may trigger an emergency action. The emergency action is described in greater details herein further below.

Step 1110: Providing a Second Electric Current to the Motor for Exerting a Second Force on the Lid, the Second Electric Current Having a Second Value The method 1100 further comprises providing, at step 1110, a second electric current to the motor for exerting a second force on the lid, the second electric current having a second value when the lid is between the first intermediary position and a second intermediary position, the second intermediary position being defined between the first intermediary position and the closed position. In this embodiment, the second intermediary position corresponds to $\theta=\theta_B=10$ degrees with respect to a horizontal plane.

In this embodiment, the second value has a sign opposite to a sign of the first value. As a result, the second force is applied in an opposite direction of the first force. In some embodiments, the lid is rotatable about a horizontal axis between the opened position and the closed position, such that the second force applied to the lid partially counteracts a gravitational force applied to the lid between the first intermediary position and the second intermediary position. The second force may be, for example, a coupling force.

In this embodiment, during the second phase and in response to the movement value being below a second pre-determined movement value (e.g. due to dampening or blockage of the rotation by an obstacle), the processor may decrease the second value of the second electric current to a decreased second value for exerting a decreased second force on the lid. An absolute value of the decreased second value is below an absolute value of the second value.

Furthermore, in response to the decreased second value being equal to a second threshold value (e.g. $I_{TH2}$), the processor may trigger an emergency action.

Step 1115: Providing a Third Electric Current to the Motor for Exerting a Third Force on the Lid, the Third Electric Current Having a Third Value The method 1100 further comprises providing, at step 1115, a third electric current to the motor for exerting a third force on the lid, the third electric current having a third value when the lid is between the second intermediary position and the closed position. In this embodiment, the closed position corresponds to $\theta=0$. The lid may be locked in the closed position by, for example, a locking system once the lid reaches the closed position.

In this embodiment, the third value has a same sign as the sign of the first value, such that the third force is applied in a same direction as the first force. The third value may be higher than the first value, such that the first force is smaller than the third force in terms of norm.

In some embodiments, the first value and the third value are positive values, and the second value is a negative value. In alternative embodiments, the first value and the third value are negative values, and the second value is a positive value.

In this embodiment, during the third phase and in response to the movement value being below a third pre-determined movement value (e.g. due to dampening or blockage of the rotation by an obstacle), the processor may increase the third value of the third electric current to an increased third value for exerting an increased third force on the lid. An absolute value of the increased third value is above an absolute value of the third value.

Furthermore, in response to the increased third value being equal to a third threshold value (e.g. $I_{TH3}$), the processor may trigger an emergency action.

The following illustrative emergency actions may be triggered. In one embodiment, upon triggering the emergency action, the processor causes the motor to be provided with a fourth electric current for exerting a fourth force on the lid, the fourth electric current having a fourth value. The fourth value is set such that the motor exerts a fourth coupling force on the lid in order to rotate the lid in an opposite direction to a current rotation direction.

More specifically, in response to the emergency action being triggered in the second phase, the fourth value has a same sign than a sign of the decreased second value, an absolute value of the fourth value being above the absolute value of the second value. Therefore, the fourth force is applied in a same direction than the second force.

In response to the emergency action being triggered in the first or third phase, the fourth value has an opposite sign to the sign of the decreased first or third value respectively. Therefore, the fourth force is applied in an opposite direction than the first and third forces.

In an alternative embodiment, upon triggering the emergency action, the processor causes the lid to rotate back and forth for a pre-determined amount of times. In other words, if determination is made that the emergency action is triggered when the lid is in a given angular position, the processor causes the lid to rotate in an opposite direction by a pre-determined amount of degrees, and rotate back in the original rotation direction. In other words, it can be said that the electric current provided to the motor is varied, for a pre-determined amount of times, a pre-determined value and the current threshold value.

If the rotation is still dampened or blocked by the obstacle, the processor causes the lid to repeat such back and forth movement for a pre-determined amount of times (e.g. three times). If the rotation is yet still dampened or blocked by the obstacle at the given angular position, the processor may cause the motor to immobilize the lid. The lid may be, for example, positioned in a pre-determined positioned (e.g. the opened position) and maintained in said pre-determined position in response to the emergency action being triggered. Alternatively, the lid may be immobilized in a current position in response to the emergency action being triggered.

As a result, in some embodiments, the emergency action enables the lid to be at least partially opened in order to prevent the lid and/or an obstacle blocking the rotation of the lid from being damaged.

Modifications and improvements to the above-described implementations of the present technology may become apparent to those skilled in the art.

The foregoing description is intended to be exemplary rather than limiting. The scope of the present technology is therefore intended to be limited solely by the scope of the appended claims.

The invention claimed is:

1. A method of operating a lid of a robotic vehicle, the lid providing access to an interior space of the robotic vehicle in an opened position and preventing access to the interior space in a closed position, the lid being operable by a motor for moving the lid between the opened position and the closed position, the method comprising:

when the lid is between the opened position and a first intermediary position, the first intermediary position being defined between the opened position and the closed position, providing a first electric current to the motor for exerting a first force on the lid, the first electric current having a first value;

when the lid is between the first intermediary position and a second intermediary position, the second intermediary position being defined between the first intermediary position and the closed position, providing a second electric current to the motor for exerting a second force on the lid, the second electric current having a second value, the second value having a sign opposite to a sign of the first value, the second force being applied in an opposite direction of the first force;

when the lid is between the second intermediary position and the closed position, providing a third electric current to the motor for exerting a third force on the lid, the third electric current having a third value, the third value having a same sign as the sign of the first value, the third force being applied in a same direction as the first force.

2. The method of claim 1, wherein the lid is rotatable about a horizontal axis between the opened position and the closed position, the second force being applied to the lid for partially counteracting a gravitational force applied to the lid between the first intermediary position and the second intermediary position.

3. The method of claim 1, wherein the first value and the third value are positive values, and the second value is a negative value.

4. The method of claim 1, wherein the first value and the third value are negative values, and the second value is a positive value.

5. The method of claim 1, wherein the first value is lower than the third value, and the first force is smaller than the third force.

6. The method of claim 1, wherein the method further comprises locking the lid when in the closed position.

7. The method of claim 1, wherein the method further comprises:

monitoring a movement value of the lid between the opened position and the closed position;

in response to the movement value being below a pre-determined movement value:

when the lid is between the opened position and the first intermediary position, increasing the first value of the first electric current to an increased first value for exerting an increased first force on the lid, an absolute value of the increased first value being above an absolute value of the first value;

in response to the increased first value being equal to a first threshold value, triggering an emergency action.

8. The method of claim 1, wherein the method further comprises:

monitoring a movement value of the lid between the opened position and the closed position;

in response to the movement value being below a pre-determined movement value:

when the lid is between the first intermediary position and the second intermediary position, decreasing the second value of the second electric current to a decreased second value for exerting a decreased second force on the lid, an absolute value of the decreased second value being below an absolute value of the second value;

in response to the decreased second value being equal to a second threshold value, triggering an emergency action.

9. The method of claim 8, wherein triggering the emergency action comprises providing a fourth electric current to the motor for exerting a fourth force on the lid, the fourth electric current having a fourth value, the fourth value having a same sign than a sign of the decreased second value, an absolute value of the fourth value being above the absolute value of the second value, the fourth force being applied in a same direction than the second force.

10. The method of claim 8, wherein triggering the emergency action comprises positioning and maintaining the lid in the opened position.

11. The method of claim 8, wherein triggering the emergency action comprises immobilizing the lid.

12. The method of claim 11, where triggering the emergency action further comprises varying, for a pre-determined amount of times, the second value of the second electric current between a nominal value and the decreased second value.

13. The method of claim 1, wherein the lid in the closed position is at 0 degrees with respect to a horizontal plane.

14. The method of claim 1, wherein the lid in the second intermediary position is at 10 degrees with respect to a horizontal plane.

15. The method of claim 1, wherein the lid in the first intermediary position is at 50 degrees with respect to a horizontal plane.

16. The method of claim 1, wherein the lid in the opened position is at 0 degrees with respect to a vertical plane.

17. A robotic vehicle comprising:

a body defining an interior space;
a lid operable to access the interior space;
an electrical power source; and
a processor configured to control operation of the lid, the processor being configured to:

provide, when the lid is between the opened position and a first intermediary position, the first intermediary position being defined between the opened position and the closed position, a first electric current from the electrical power source to the motor for exerting a first force on the lid, the first electric current having a first value;

provide, when the lid is between the first intermediary position and a second intermediary position, the second intermediary position being defined between the first intermediary position and the closed position, a second electric current from the electrical power source to the motor for exerting a second force on the lid, the second electric current having a second value, the second value having a sign opposite to a sign of the first value, the second force being applied in an opposite direction of the first force;

provide, when the lid is between the second intermediary position and the closed position, a third electric current from the electrical power source to the motor for exerting a third force on the lid, the third electric current having a third value, the third value having a same sign as the sign of the first value, the third force being applied in a same direction as the first force.

18. The robotic vehicle of claim 17, wherein the lid is rotatable about a horizontal axis between the opened position and the closed position, the second force being applied to the lid for partially counteracting a gravitational force applied to the lid between the first intermediary position and the second intermediary position.

19. The robotic vehicle of claim 17, wherein the first value and the third value are positive values, and the second value is a negative value.

20. The robotic vehicle of claim 17, wherein the first value and the third value are negative values, and the second value is a positive value.

\* \* \* \* \*